US012455224B2

(12) United States Patent
Stevens et al.

(10) Patent No.: US 12,455,224 B2
(45) Date of Patent: Oct. 28, 2025

(54) SINGLE PARTICLE AUTOMATED RAMAN TRAPPING ANALYSIS

(71) Applicant: Imperial College Innovations Limited, London (GB)

(72) Inventors: Molly Stevens, London (GB); Jelle Penders, London (GB); Isaac Pence, London (GB)

(73) Assignee: Sparta Biodiscovery Limited, London (GB)

( * ) Notice: Subject to any disclaimer, the term of this patent is extended or adjusted under 35 U.S.C. 154(b) by 274 days.

(21) Appl. No.: 17/252,891

(22) PCT Filed: Jun. 18, 2019

(86) PCT No.: PCT/EP2019/066106
§ 371 (c)(1),
(2) Date: Dec. 16, 2020

(87) PCT Pub. No.: WO2019/243375
PCT Pub. Date: Dec. 26, 2019

(65) Prior Publication Data
US 2021/0262915 A1    Aug. 26, 2021

(30) Foreign Application Priority Data
Jun. 19, 2018  (GB) .................................. 1810010

(51) Int. Cl.
*G01N 15/1434* (2024.01)
*G01N 15/10* (2024.01)
(Continued)

(52) U.S. Cl.
CPC ..... *G01N 15/1434* (2013.01); *G01N 15/1012* (2013.01); *G01N 21/65* (2013.01); *G01N 2015/1493* (2013.01)

(58) Field of Classification Search
None
See application file for complete search history.

(56) References Cited

U.S. PATENT DOCUMENTS

| 5,949,532 A | 9/1999 | Schrof et al. |
| 7,515,269 B1 | 4/2009 | Alexander et al. |
| (Continued) | | |

FOREIGN PATENT DOCUMENTS

| CN | 205719979 U | 11/2016 |
| WO | 2004/008121 A2 | 1/2004 |
| (Continued) | | |

OTHER PUBLICATIONS

Casabella, Stephen, et al. "Automated analysis of single cells using Laser Tweezers Raman Spectroscopy." Analyst 141.2 (2016): 689-696. (Year: 2016).*

(Continued)

*Primary Examiner* — Rufus L Phillips
(74) *Attorney, Agent, or Firm* — Womble Bond Dickinson (US) LLP

(57) ABSTRACT

An automated method of particle analysis is performed using an electromagnetic radiation source for generating a beam of electromagnetic radiation, a focusing element for directing the beam to a particle capture zone, a detector configured to detect a signal response from the particle capture zone and a control system. An electromagnetic radiation beam is focused onto a particle-conveying medium to define the particle capture zone for capturing a candidate particle within the beam. A first data acquisition procedure is performed to test for particle capture. If particle capture is not detected, the first data acquisition procedure is repeated. If a particle capture is detected within the beam, a second data acquisition procedure is performed to capture particle data using at least one analysis modality, following which the optical beam intensity is reduced to a sub-capture level (Continued)

to release the particle from the particle capture zone. The steps are repeated for successive particles in the particle-conveying medium.

28 Claims, 26 Drawing Sheets

(51) Int. Cl.
*G01N 15/14* (2024.01)
*G01N 21/65* (2006.01)

(56) References Cited

U.S. PATENT DOCUMENTS

| | | | | |
|---|---|---|---|---|
| 9,335,248 | B1* | 5/2016 | Taylor | G01N 15/1012 |
| 9,995,626 | B1* | 6/2018 | Leugers | G01J 3/4406 |
| 10,545,091 | B2 | 1/2020 | Schütze et al. | |
| 2006/0219710 | A1* | 10/2006 | McManus | B01J 19/126 |
| | | | | 219/704 |
| 2007/0059203 | A1* | 3/2007 | Burrell | G01N 21/65 |
| | | | | 356/301 |
| 2010/0141940 | A1 | 6/2010 | Caro et al. | |
| 2012/0050734 | A1* | 3/2012 | Wennmalm | G01N 21/6458 |
| | | | | 356/318 |
| 2014/0004559 | A1 | 1/2014 | Hill et al. | |
| 2015/0276476 | A1 | 10/2015 | Dholakia et al. | |
| 2016/0260513 | A1 | 9/2016 | Pan et al. | |
| 2018/0023111 | A1 | 1/2018 | Schütze et al. | |
| 2019/0376962 | A1* | 12/2019 | Vats | G01N 33/532 |

FOREIGN PATENT DOCUMENTS

WO 2012/178166 A1 12/2012
WO 2018/007415 A1 1/2018

OTHER PUBLICATIONS

Ajito, Katsuhiro, and Keiichi Torimitsu. "Near-infrared Raman spectroscopy of single particles." TrAC Trends in Analytical Chemistry 20.5 (2001): 255-262. (Year: 2001).*
Fortes, F.J., et al., "Chemical characterization of single micro- and nano-particles by optical catapulting-optical trapping-laser-induced breakdown spectroscopy" Spectrochimica Acta Part B (2014) 100:78-85.
Wu, M.Y., et al., "Stable optical trapping and sensitive characterization of nanostructures using standing-wave Raman tweezers" Sci. Rep. (2017) 7:42930.
Redding, B., et al., "Raman Spectroscopy of Optically Trapped Single Biological Micro-Particles" Sensors (2015) 15:19021-19046.
Adjei, I.M., et al., "Heterogeneity in nanoparticles influences biodistribution and targeting" Nanomedicine (2014) 9(2):267-278.
Kallepitis, C., et al., "Quantitative volumetric Raman imaging of three dimensional cell cultures" Nat. Comm. (2017) 8:14843.
Ashkin, A., "Acceleration and Trapping of Particles by Radiation Pressure" Phys. Rev. Lett. (1970) 24:156-159.
Ashkin, A., et al., "Observation of a single-beam gradient force optical trap for dielectric particles" Optics Lett. (1986) 11(5):288-290.
Cherney, D.P., et al., "Optical Trapping of Unilamellar Phospholipid Vesicles: Investigation of the Effect of Optical Forces on the Lipid Membrane Shape by Confocal-Raman Microscopy" Anal. Chem. (2004) 76:4920-4928.
Ajito, K., "Combined Near-Infrared Raman Microprobe and Laser Trapping System: Application to the Analysis of a Single Organic Microdroplet in Water" Appl. Spectrosc. (1998) 52:339-342.
Ajito, K., et al., "Near-infrared Raman spectroscopy of single particles" Trends Anal. Chem. (2001) 20(5):255-262.
Donato, M.G., et al., "Optical trapping of porous silicon nanoparticles" Nanotechnology (2011) 22:505704.
Sanderson, J.M., et al., "Analysis of liposomal membrane composition using Raman tweezers" Chem. Commun. (2004) 1120-1121.
Xue, G., et al., "Phase-separation and photoresponse in binaryazobenzene-containing polymer vesicles" Colloids and Surfaces A: Physicochem. Eng. Aspects (2013) 436:1007-1012.
Stremersch, S., et al., "Identification of Individual Exosome-Like Vesicles by Surface Enhanced Raman Spectroscopy" Small (2016) 12(24):3292-3301.
Smith, Z.J., et al., "Single exosome study reveals subpopulations distributed among cell lines with variability related to membrane content" Journal of Extracellular Vesicles (2015) 4:28533.
Schaefer, J.J., et al., "Confocal Raman Microscopy for Investigating Synthesis and Characterization of Individual Optically Trapped Vinyl-Polymerized Surfactant Particles" Appl. Spectrosc. (2014) 68:633-641.
Houlne, M.P., et al., "Confocal Raman Microscopy for Monitoring Chemical Reactions on Single Optically Trapped, Solid-Phase Support Particles" Anal. Chem. (2002) 74:4311-4319.
Hardcastle, C.D., et al., "Confocal Raman Microscopy for pH-Gradient Preconcentration and Quantitative Analyte Detection in Optically Trapped Phospholipid Vesicles" Anal. Chem. (2015) 87:7979-7986.
Cherney, D.P., et al., "Optical-Trapping Raman Microscopy Detection of Single Unilamellar Lipid Vesicles" Anal. Chem. (2003) 75:6621-6628.
Cherney, D.P., et al., "Confocal Raman Microscopy of Optical-Trapped Particles in Liquids" Annu. Rev. Anal. Chem. (2010) 3:277-97.
Yamakoshi, H., et al., "Alkyne-Tag Raman Imaging for Visualization of Mobile Small Molecules in Live Cells" J. Am. Chem. Soc. (2012) 134:20681-20689.
Cho, E.J., et al., "Nanoparticle Characterization: State of the Art, Challenges, and Emerging Technologies" Mol. Pharmaceutics (2013) 10:2093-2.
Algar, W.R., et al., "The Controlled Display of Biomolecules on Nanoparticles: A Challenge Suited to Bioorthogonal Chemistry" Bioconjugate Chem. (2011) 22:825-858.
Penders, J., et al., "Single Particle Automated Raman Trapping Analysis" Nat. Comm. (2018) 9:4256.
Lee, K., et al., "Multiplexed Profiling of Single Extracellular Vesicles" ACS Nano (2018) 12:494-503.
Wright, A.J., et al., "Optical trapping and enhanced Raman spectroscopy of liposome encapsulated silver decahedral nanoparticles" Optics in the Life Sciences (2017) OtS2E.4.
PCT/EP2019/066106, International Preliminary Report on Patentability, Dec. 22, 2020.
PCT/EP2019/066106, Written Opinion, Dec. 26, 2019.
PCT/EP2019/066106, International Search Report, Dec. 26, 2019.
UK Intellectual Property Office, GB1810010.7, Examination Report, Dec. 18, 2018.

* cited by examiner

SINGLE PARTICLE AUTOMATED RAMAN TRAPPING ANALYSIS

This application is a § 371 application of PCT/EP2019/066106, filed Jun. 18, 2019, which in turn claims priority to GB Application No. 1810010.7, filed Jun. 19, 2018. The entire disclosure of each of the foregoing applications is incorporated by reference herein.

The analysis of particles such as nanoparticles in solution is a crucial step for a wide range of research fields. The expression 'particles' in the context of this disclosure is intended to encompass micro- and nano-particles and any other objects that are generally capable of being captured using an electromagnetic beam gradient force trapping effect, and in particular polymer particles and vesicles for drug delivery systems, such as liposomes and polymersomes, as well as extra-cellular vesicles or exosomes.

Particle sizing and compositional analysis is typically achieved by combining a range of laser-based diffraction and spectroscopic techniques. Dynamic Light Scattering (DLS) and Nanoparticle Tracking Analysis (NTA) are generally employed to determine the particle population size distribution[1-3], whereas compositional analysis can be conducted using Mass Spectrometry (MS) techniques as well as (Fourier-transform)-Infrared (IR) spectroscopy[4-6] among others, depending on the type and size of particles. The reliance on multiple techniques for sizing and composition analysis, brings the drawback that these vary in sample requirements, such as concentration, preparation, and sensitivity. For nanoparticles in particular, population heterogeneity can severely affect their function and applicability, which cannot be resolved with these conventional bulk analysis techniques[7,8].

It is an object of the present invention to provide method and apparatus facilitating improvements in the ability to capture and retain particles for data acquisition and subsequent analysis.

According to one aspect, the present invention provides an automated method of particle analysis comprising:
(i) focusing an electromagnetic radiation beam onto a particle-conveying medium to define a particle capture zone for capturing a candidate particle within the beam;
(ii) performing a first data acquisition procedure to test for particle capture;
(iii) if particle capture is not detected, repeating step (ii);
(iv) if a particle capture is detected, acquiring particle data from the captured particle;
(v) reducing the optical beam intensity to a sub-capture level to release the particle from the particle capture zone;
(vi) repeating steps (i) to (v) for successive particles in the particle-conveying medium.

Step (iv) may further comprise performing a second data acquisition procedure to capture the particle data using at least one analysis modality. The acquired particle data in step (iv) may comprise data from the first data acquisition procedure. The first data acquisition procedure may comprise performing a Raman response data gathering procedure sufficient to detect the presence of a predetermined spectral profile above a threshold indicative of a particle capture. Step (v) may further comprise waiting for a delay period after reducing the optical beam intensity to a sub-capture level, sufficient for the previously captured particle to be transported out of the particle capture zone and into the surrounding medium. The second data acquisition procedure may comprise performing a Raman response data gathering procedure facilitating a greater signal-to-noise ratio than that of the first data acquisition procedure. The second data acquisition procedure may comprise performing a data gathering procedure comprising any one or more of: an extended period of data capture for higher signal to noise ratio; gathering of spectrally extended data; collection of data using a different modality to the first data acquisition procedure; multiple periods of data capture for averaging; data gathering at altered laser power for increased signal to noise ratio. The different modality may comprise one or more of fluorescence spectra and optical absorption spectra.

The method may further include a calibration procedure for determining the threshold used in step (ii), the calibration procedure comprising establishing a spectral feature which differentiates between (i) a Raman response of a target particle to the beam and (ii) a Raman response of the particle-conveying medium without a target particle to the beam. The calibration procedure may comprise determining one or more spectral features of the Raman response that provide said differentiation, the spectral features comprising one or more of a peak amplitude, multiple peak amplitudes, an area under one or more portions of the Raman response spectrum and a profile of at least a part of the Raman response spectrum.

The method may further include a calibration procedure for determining the threshold used in step (ii), the calibration procedure comprising: acquiring a reference spectrum from the particle-conveying medium without particles therein; acquiring a test spectrum from the particle-conveying medium with particles therein; determining a difference between the reference spectrum and the test spectrum; and if the difference is greater than a noise threshold of the reference spectrum, determining that a particle has been captured. The method may further include establishing a spectral feature in the test spectrum which is greater than the noise threshold and which therefore differentiates between (i) a Raman response of a target particle to the beam and (ii) a Raman response of the particle-conveying medium without a target particle to the beam.

The method may further include using the first data and/or the second data acquired in the first and/or second data acquisition procedures to determine a size of a captured particle. Determining a size of captured particle may comprise determining a decrease in a spectral response signal that is characteristic of the particle-conveying medium without a particle therein, when a particle capture is detected. The spectral signal characteristic of the particle-conveying medium may comprise a spectral signal from a marker dispersed within the particle-conveying medium. The marker may comprise perchlorate ions.

The method may further include: after step (iv), initiating a chemical change in a captured particle and repeating step (iv); or after step (v) initiating a chemical change in the particles in the particle-conveying medium and repeating steps (i) to (v).

The method may further include: monitoring a chemical change in a captured particle by repeating step (iv); or monitoring a chemical change in the particles in the particle-conveying medium by repeating steps (i) to (v).

Step (v) may comprise disabling or shuttering the beam.

According to another aspect, the present invention provides a particle trapping and data acquisition apparatus comprising:
an electromagnetic radiation source for generating a beam of electromagnetic radiation;
a focusing element for directing the beam to a particle capture zone;

a detector configured to detect a signal response from the particle capture zone;

a control system configured to implement any of the methods defined above.

According to another aspect, the invention provides a computer program, distributable by electronic data transmission or by computer readable medium, comprising computer program code means adapted, when said program is loaded onto a particle trapping and data acquisition apparatus, to make the apparatus execute the procedure of any one of the methods defined above.

Embodiments of the present invention will now be described by way of example and with reference to the accompanying drawings in which.

Figure 1:
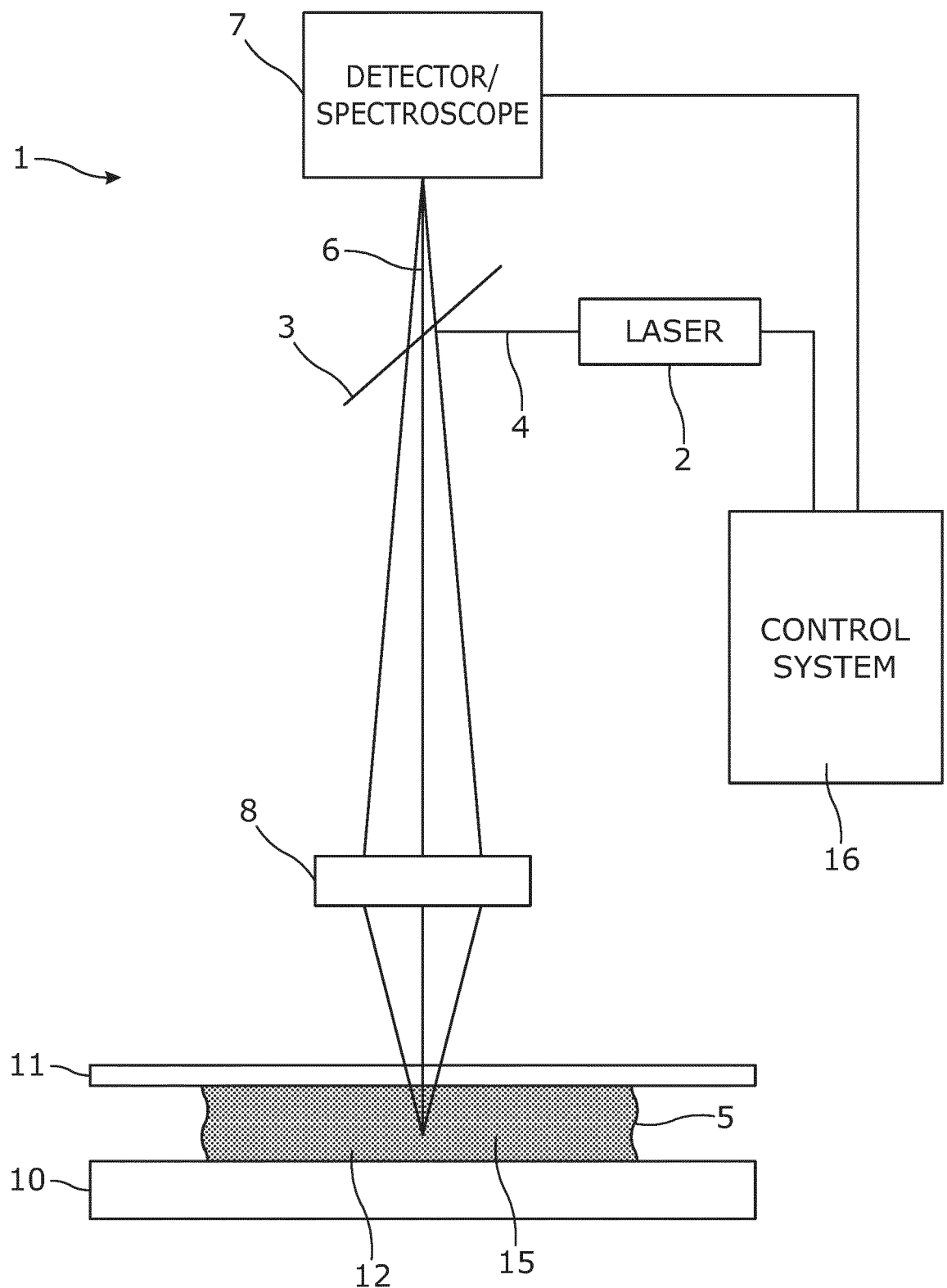
FIG. 1 shows a high level schematic diagram of an automated particle capture system for particle analysis.
Figure 9:
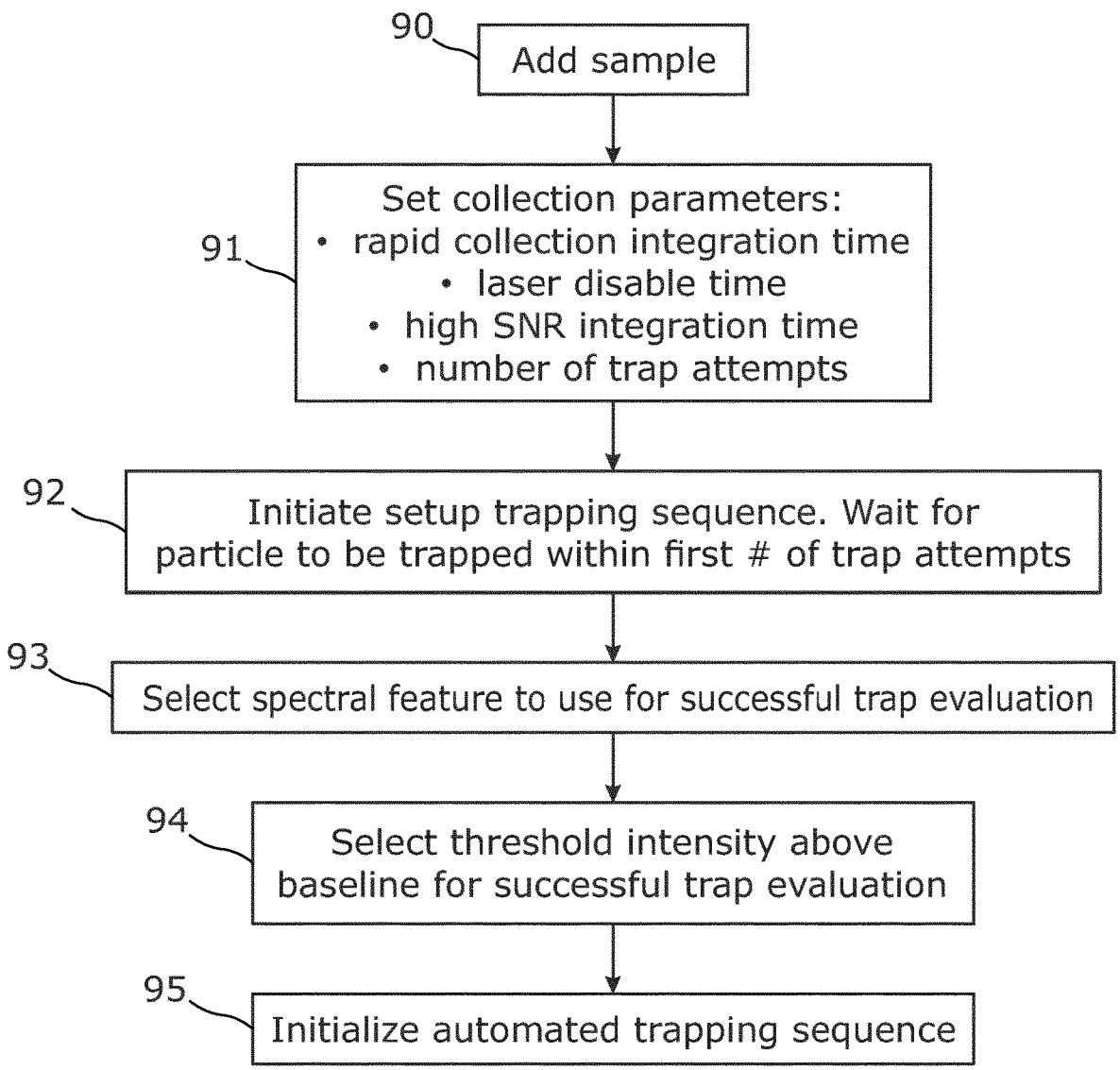
Figure 10:
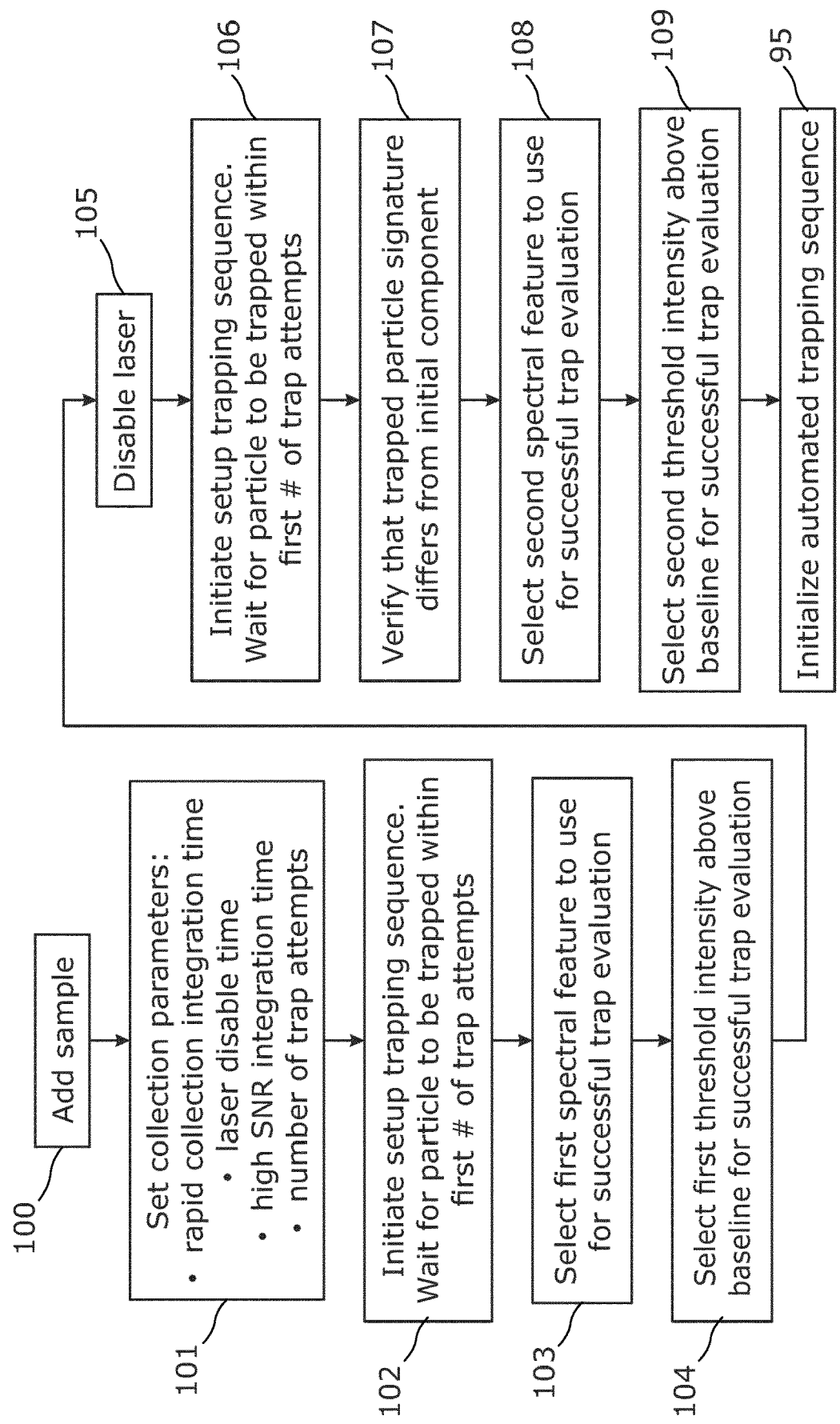
Figure 11:
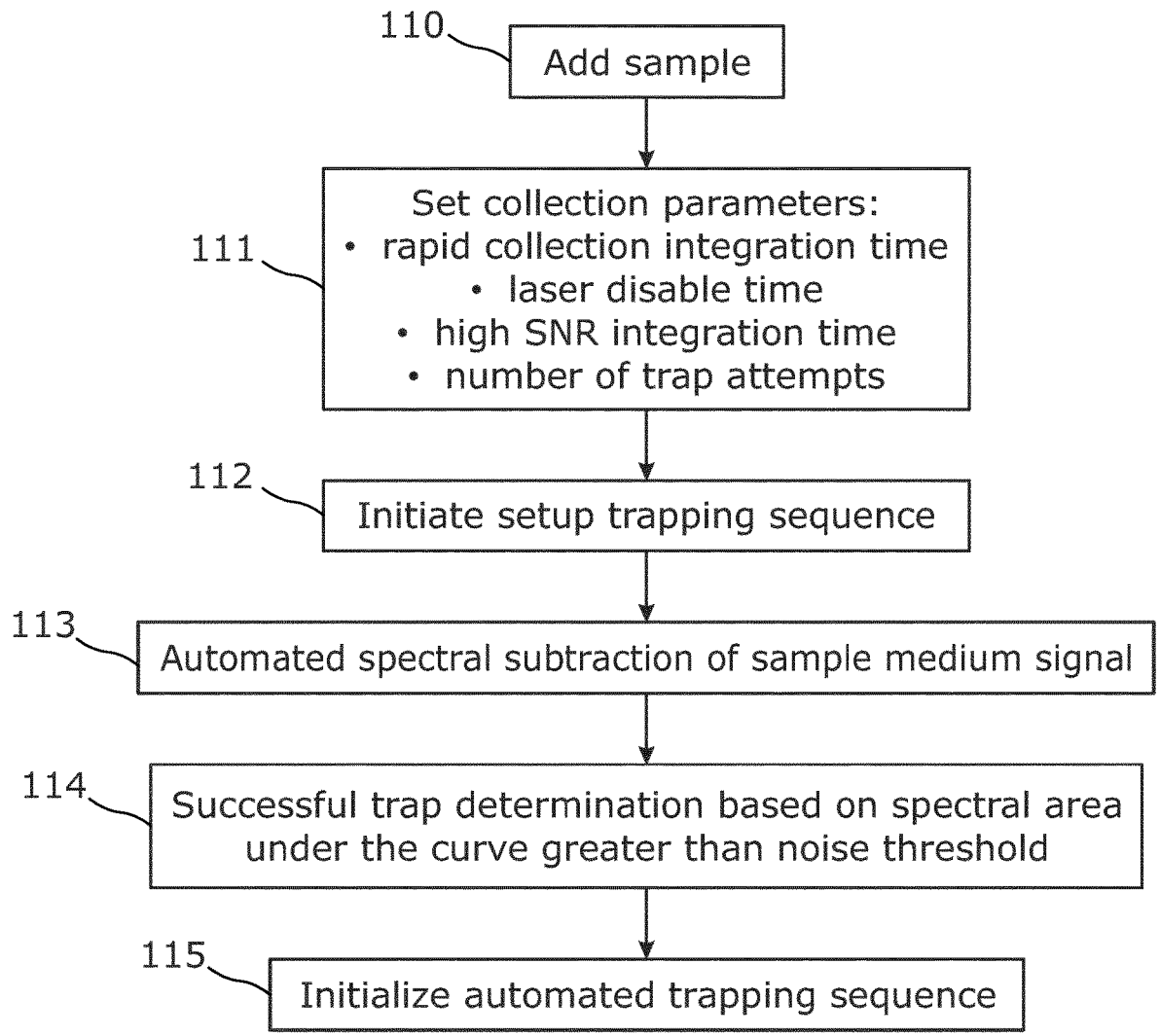
Figure 12A:
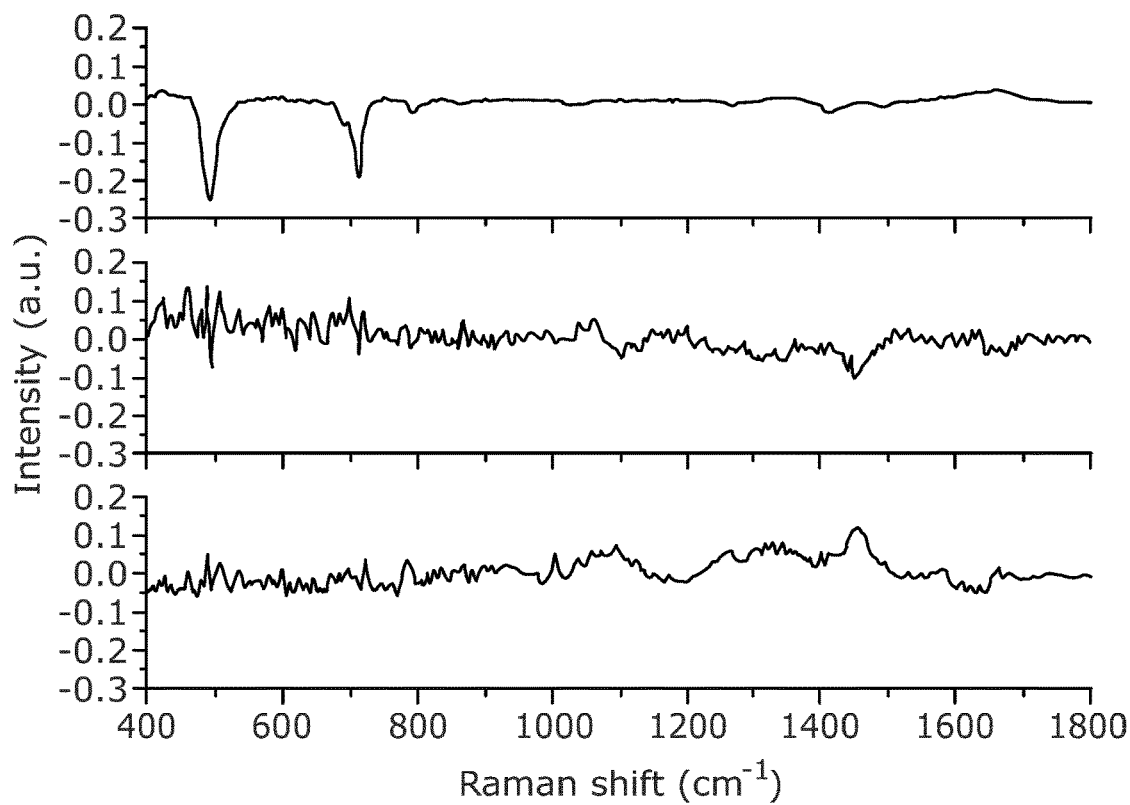
Figure 12B:
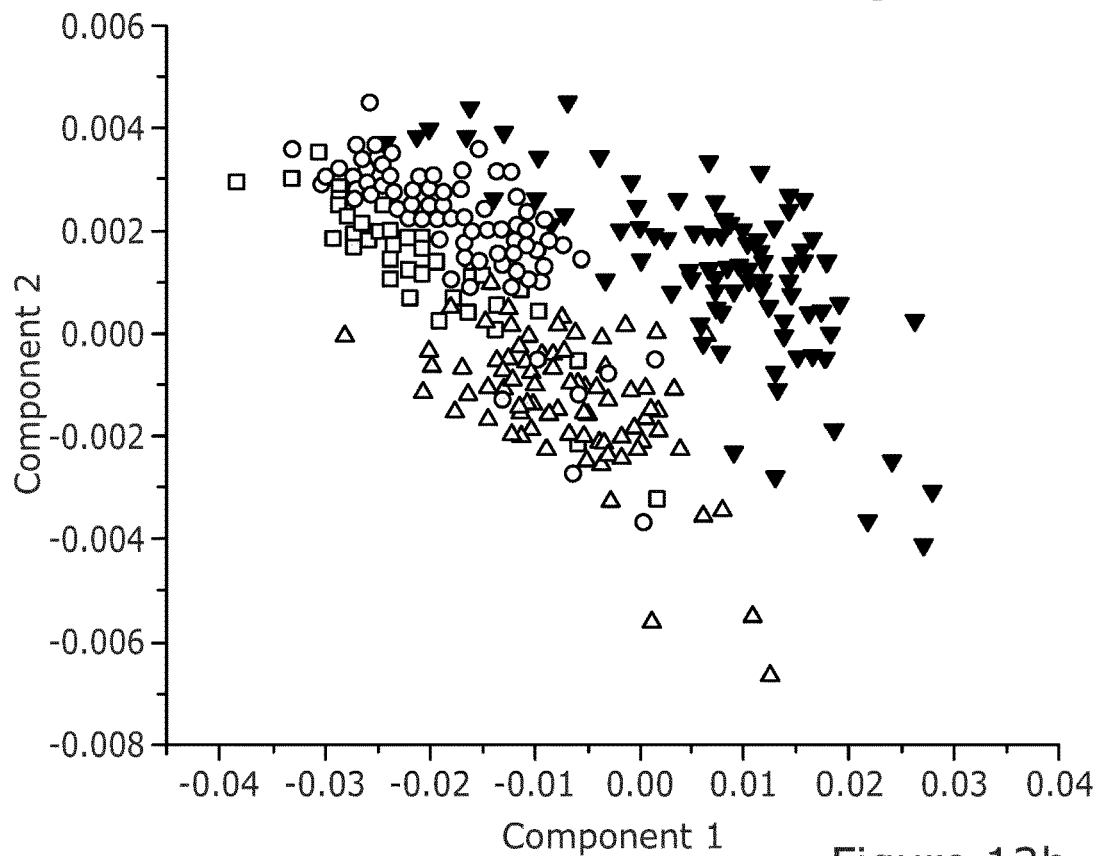
Figure 13:
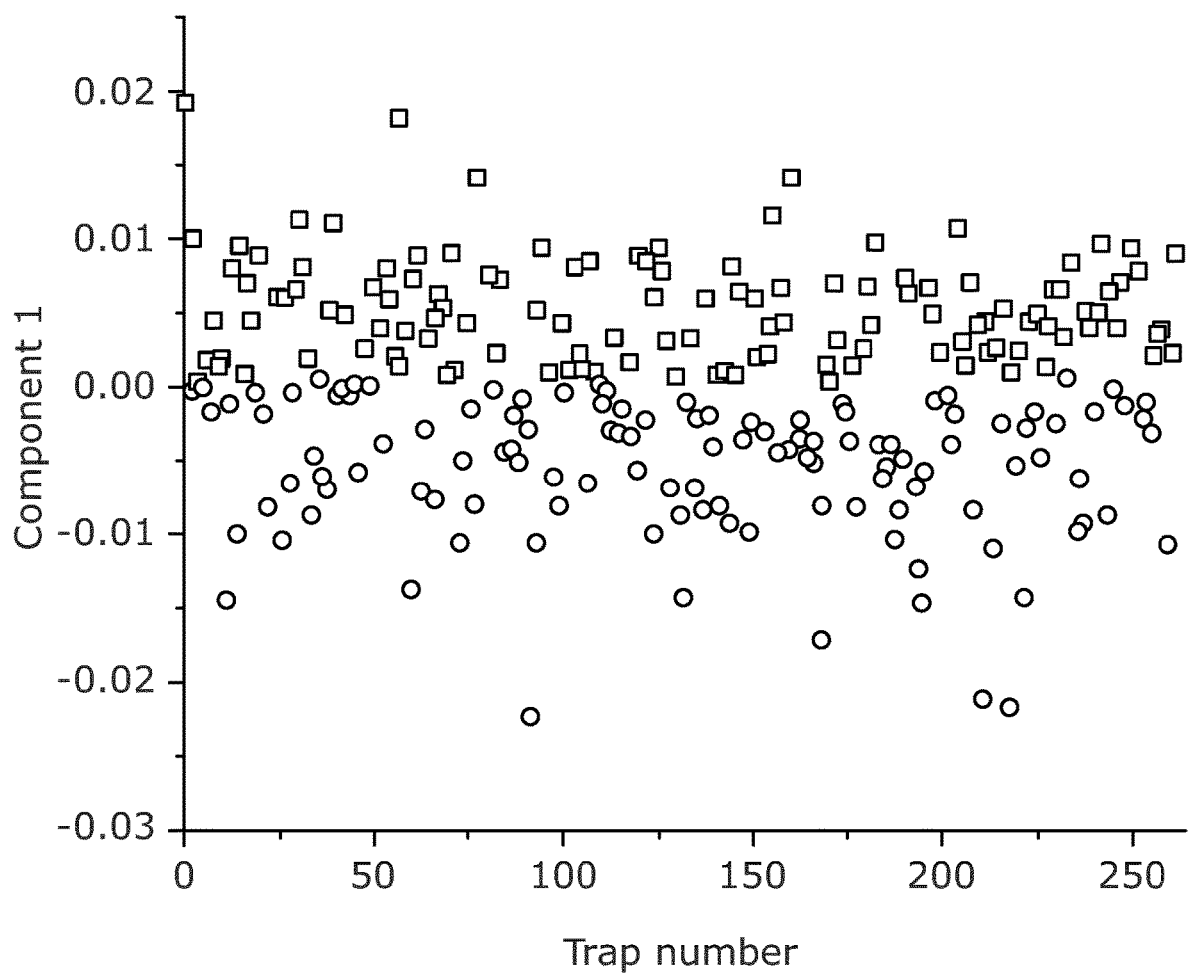
Figure 14:
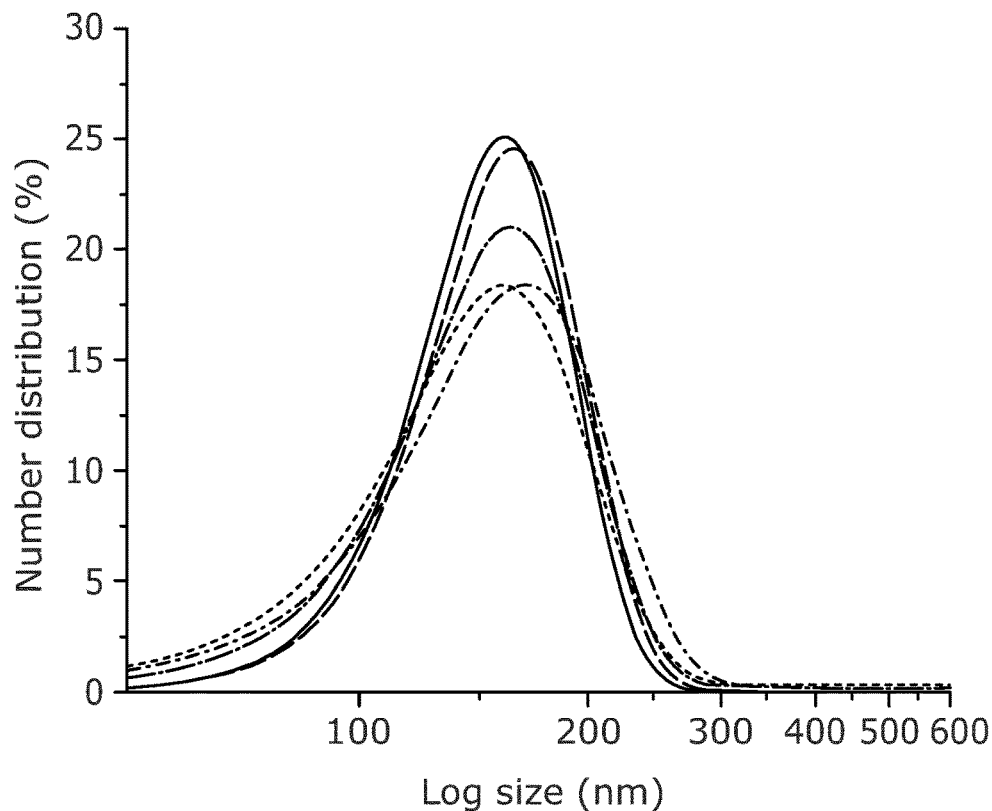
Figure 15:
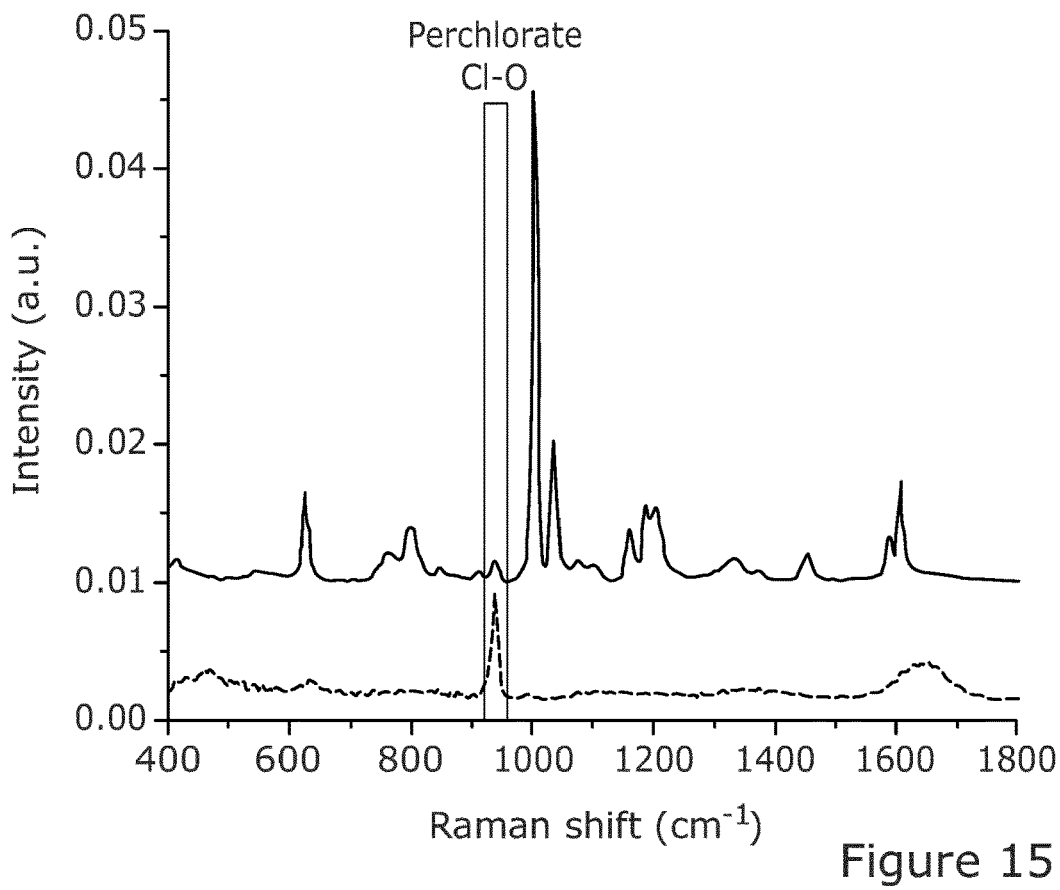
Figure 16:
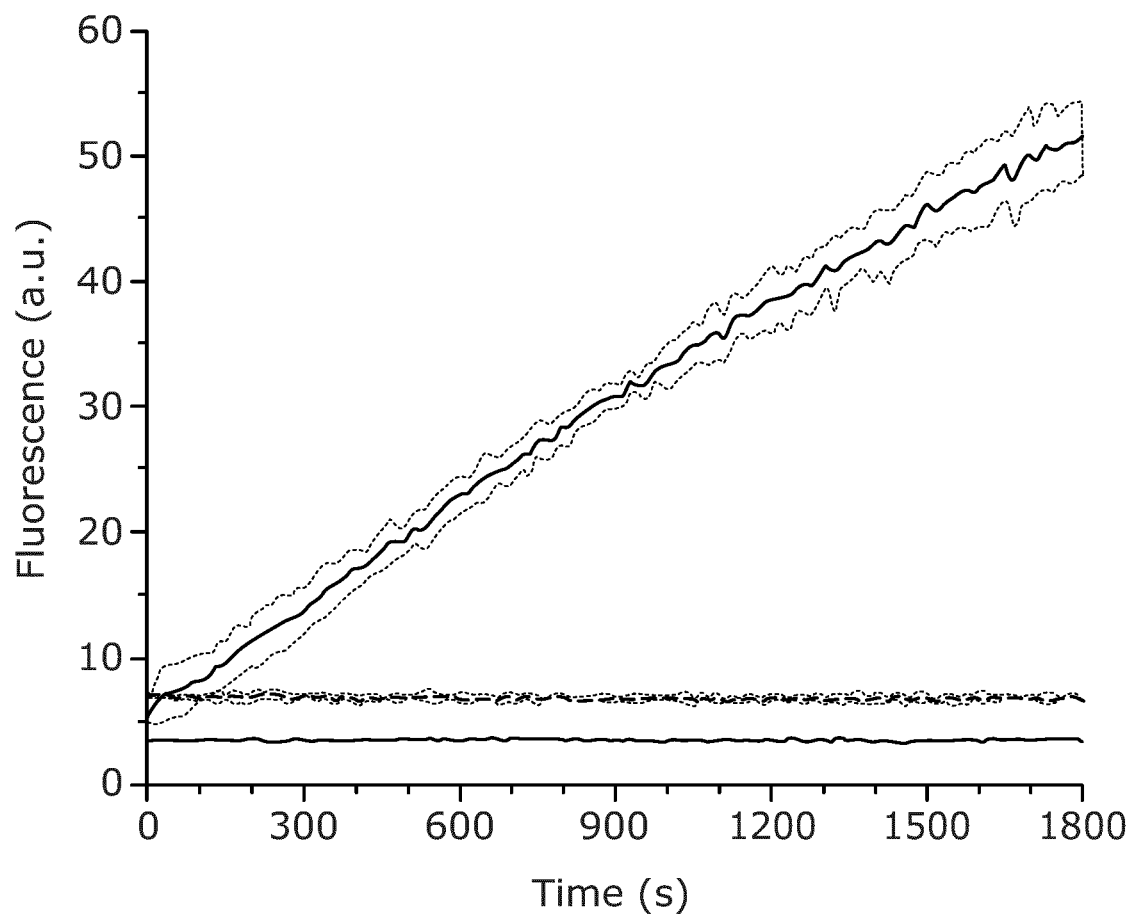
Figure 17:
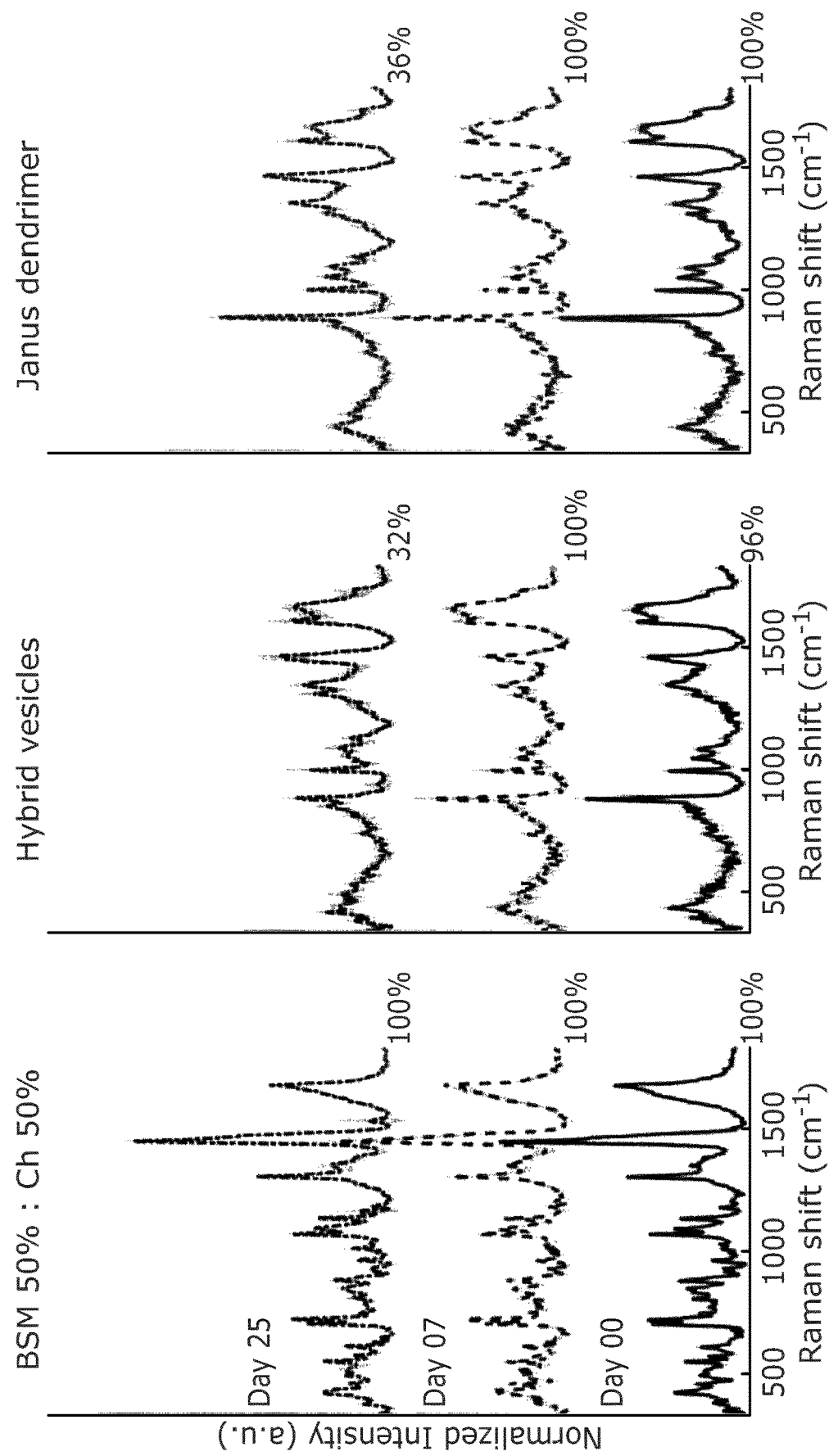
Figure 18:
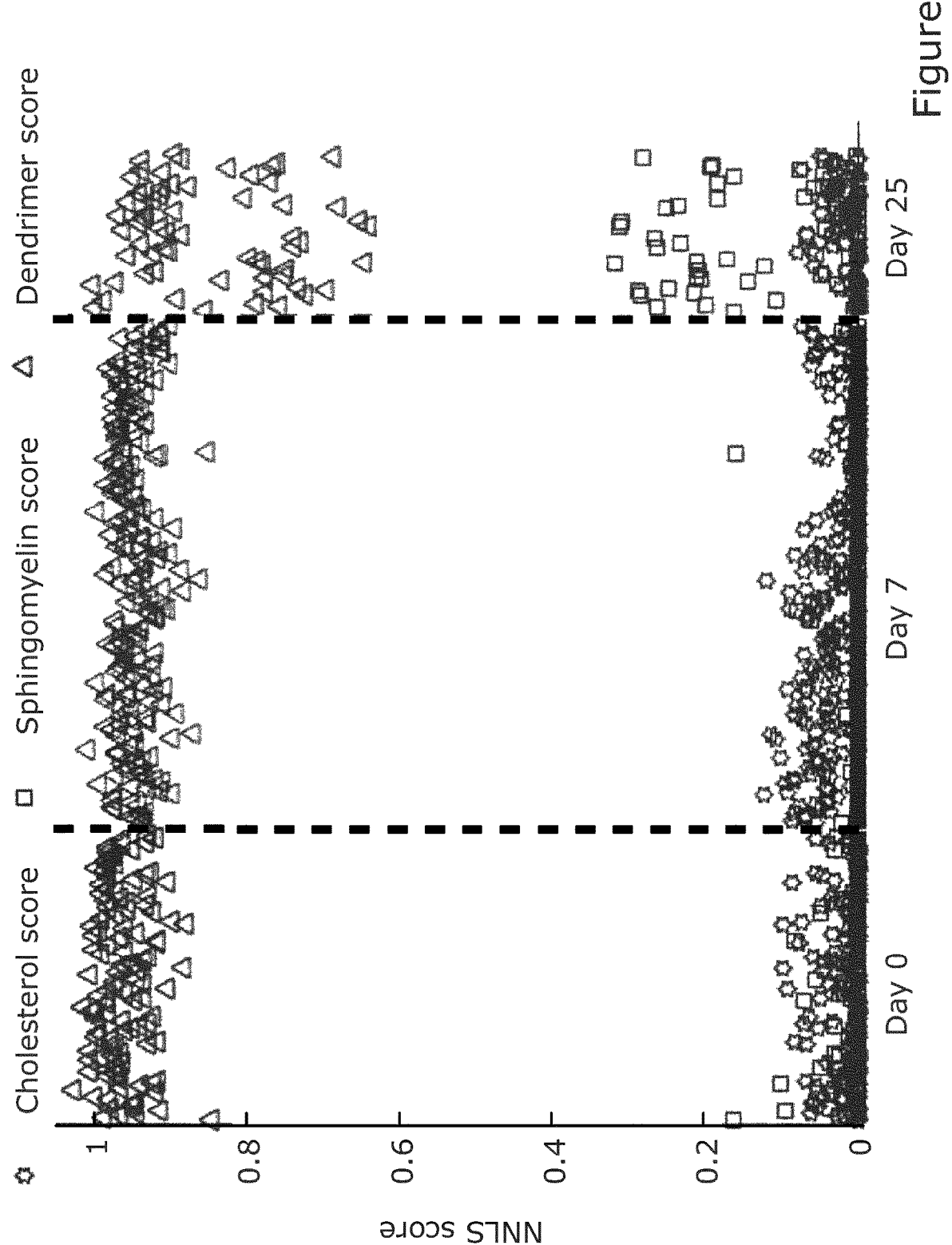
Figure 19:
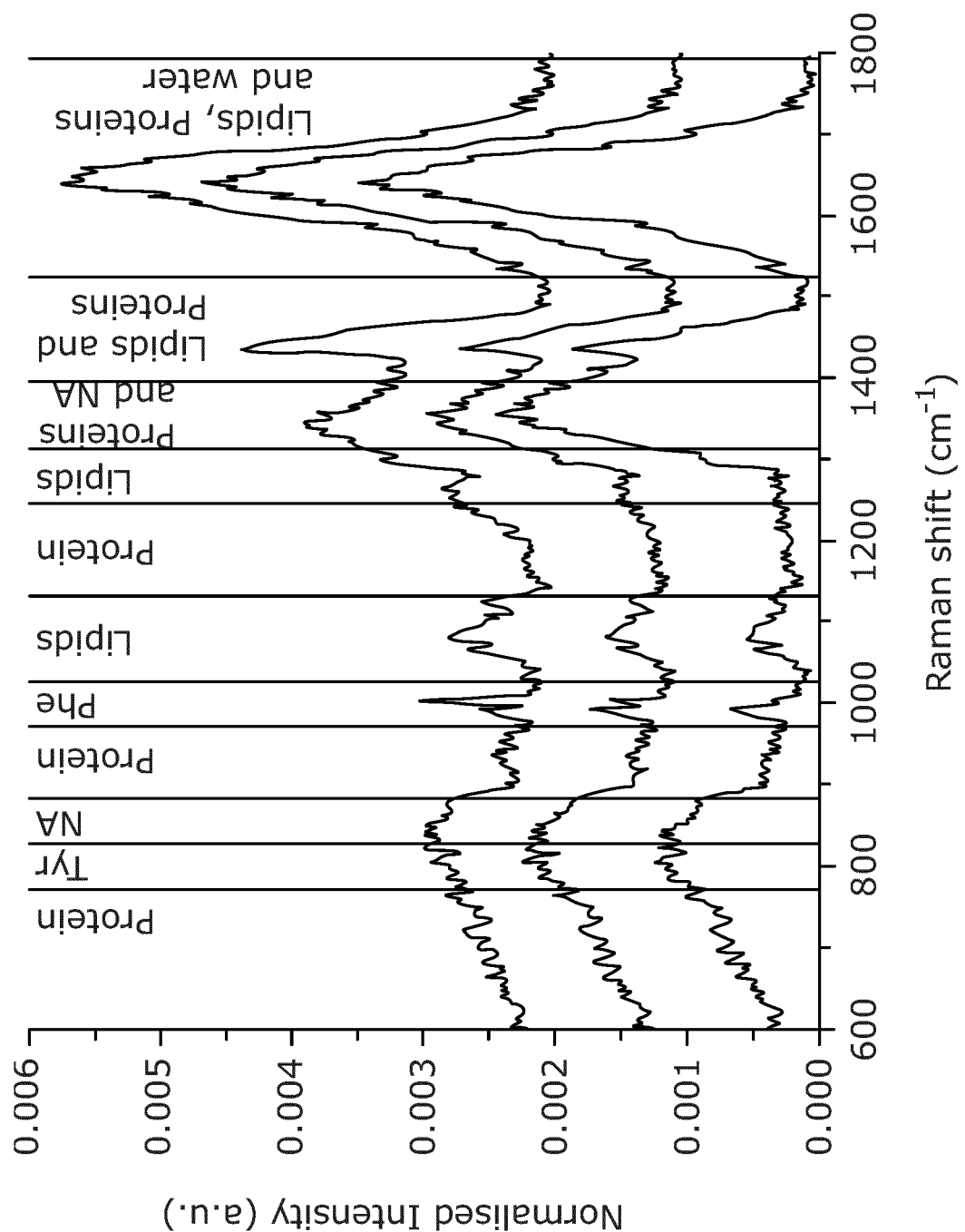
Figure 21:
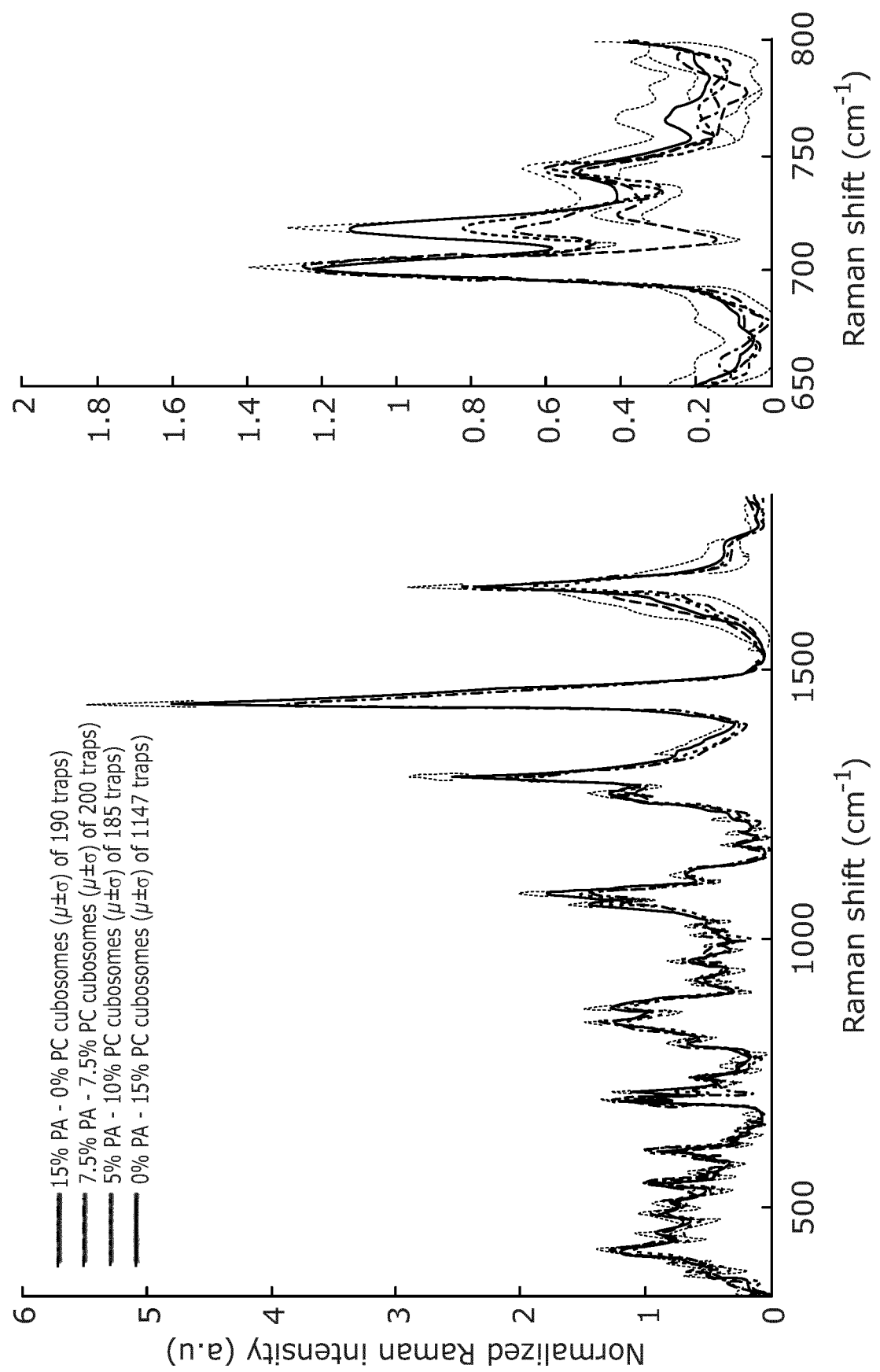
Figure 22:
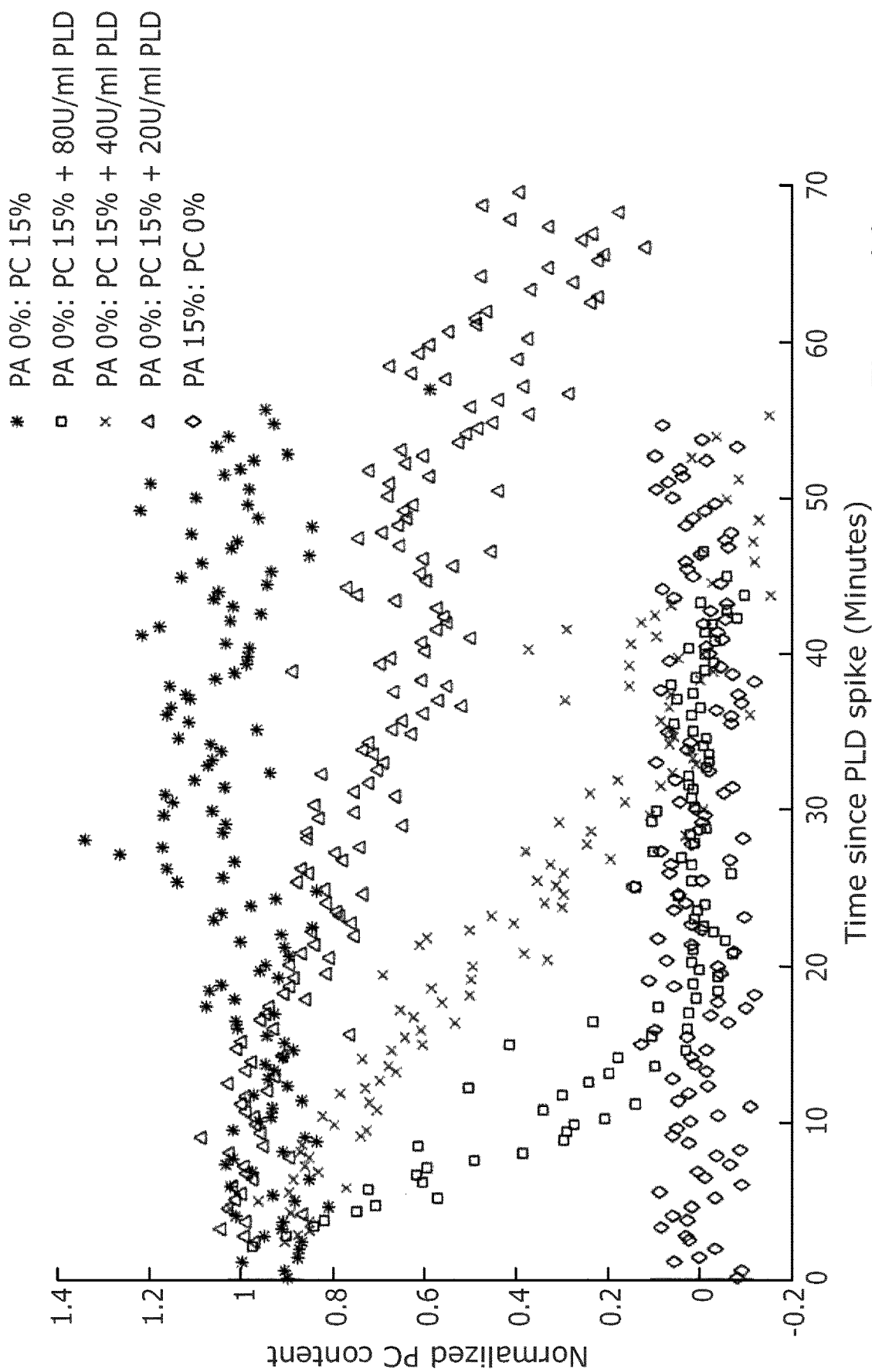

FIG. 5 shows results of composition analysis of liposomes and polymersomes using the system of FIG. 1: (a) Offset averaged Raman spectra of DPPC liposomes (green μ+σ, n=649) and 50% d-DPPC liposomes (red μ+σ, n=340). (b) Gaussian 2 component mixture analysis based on expectation maximisation; bimodal histogram of the CCD counts at the C-D peak position (2105 $cm^{-1}$) of a 50-50 v/v % mixture of DPPC and d-DPPC liposomes (n=828) with 44% classed as DPPC and 56% as d-DPPC. (c) Ward's clustering dendogram of a 50-50 v/v % mixture of DPPC and d-DPPC liposomes (n=828). (d) Offset averaged Raman spectra of ABA polymersomes (red, n=99) and ABA-Heparin polymersomes (blue, n=98), insert showing a close-up of the region with arrows denoting Heparin signals around 930 and 1070 $cm^{-1}$. (e) 2 component PCA decomposition analysis of a 50-50 v/v % mixture of ABA and ABA-Heparin polymersomes (n=263), component 1 (top) and component 2 (bottom). (f) PCA scores post Ward's clustering (red ABA-like, blue ABA-Heparin-like);

FIG. 6 shows results from functionalisation analysis of polystyrene nanoparticles using the system of FIG. 1: (a) Schematic overview of the PS nanoparticle (blue sphere) functionalisation path. Amine functionalised particles are treated with 2-iminothiolane (Traut's reagent) leading to sulfhydryl functionalised particles (I). Addition of 5,5'-dithio-bis-(2-nitrobenzoic acid) (DTNB) leads to disulphide bond formation (II), which can be exchanged by the tripeptide consisting of cysteine-tyrosine-tyrosine (CYY) (III). Addition of Tris(2-carboxyethyl) phosphine (TCEP) to a disulphide containing particle returns the sulfhydryl functionalisation. (b) Averaged offset Raman spectra of trapped PS particles with sulfhydryl functionalisation (black, n=201), disulphide and nitrobenzoic acid (red, n=119) and disulphide and CYY functionalised particles (blue, n=122). Bands indicating the characteristic S-S stretch (452, 512 $cm^{-1}$), tyrosine ring breathing (C=C 840, 860 $cm^{-1}$) and S-H bend (936 $cm^{-1}$) vibrations. (c) Averaged offset Raman spectra of trapped PS particles with sulfhydryl functionalisation (black, n=201) recovery of sulfhydryl after addition of TCEP to disulphide and nitrobenzoic acid functionalisation (orange, n=119), and to CYY functionalisation (green, n=115);

FIG. 7 shows results of solution marker mediated sizing analysis using the system of FIG. 1: (a) Scatterplot of the perchlorate ratio for 150 traps of 50 nm (red circles), 100 nm (blue triangles) and 200 nm (orange diamonds) polystyrene particles and PBS background (black squares) containing 50 mM sodium perchlorate in the solution. (b) Average perchlorate ratio versus the log particle volume, a linear fit ($R^2$=0.99) is shown in red. (c) DLS number distributions of polystyrene particles, 50 nm (red, 53.6±13.1 nm), 100 nm (blue, 83.0±15.7 nm) and 200 nm (orange, 162.8±41.5 nm). (d-f) Histogram of particle sizes measured by DLS (dark) and calculated from the calibration curve from the Raman spectra (light) including respective Gaussian fits of 50 nm (d) 100 nm (e) and 200 nm (f) polystyrene particles;

FIG. 8 shows results from on-line dynamic reaction monitoring using the system of FIG. 1: (a) Schematic overview of the functionalisation of PS nanoparticles with an alkyne moiety via EDC-NHS coupling with propargyl amine and subsequent CuAAC reaction with azido acetic acid to form the triazole product. (b) Offset averaged Raman spectra of trapped PS particles with carboxylic acid functionalisation (black, n=100) and after alkyne functionalisation (blue, n=100). Inset showing a close-up of the alkyne peak region with a maximum at 2129 $cm^{-1}$. (c) Dynamic trace over time of the alkyne peak intensity (blue spheres, 2129 $cm^{-1}$), azide peak intensity (red squares, 2116 $cm^{-1}$) and triazole product (yellow triangles, 1331 $cm^{-1}$) for single particle trapped population dynamics and (d) single particle dynamics;

FIG. 9 shows an algorithm for a first set-up/calibration procedure of the system of FIG. 1, using a single detected feature of a Raman spectrum;

FIG. 10 shows an algorithm for a second set-up/calibration procedure of the system of FIG. 1, using dual detected features of a Raman spectrum;

FIG. 11 shows an algorithm for an automated set-up/calibration procedure of the system of FIG. 1;

FIG. 12 shows results of SPARTA (as defined below) polymersome composition analysis, PLSDA classification: 3 component PLSDA classification analysis of a 50-50 v/v % mixture of ABA and ABA-Heparin polymersomes (n=263). (a) PLSDA components 1, 2 and 3 (top to bottom), (b) PLSDA scores of component 1 and 2 and classification of ABA (red) and ABA-Heparin (blue) like polymersomes, modelled using pure ABA (red, n=99) and ABA-Heparin (blue, n=98) trapping runs;

FIG. 13 shows results of classification versus trap number. PCA component 1 against the trap number of a 50-50 v/v % mixture of ABA and ABA-Heparin polymersomes (n=263), classified by PCA based Ward's clustering into ABA (red) and ABA-Heparin (blue) populations. Plot shows a random distribution of trapping of both particles over time;

FIG. 14 shows results of DLS number distributions of polystyrene particles during serial functionalisation. Gaussian fits of DLS number distributions for PS particles with sulfhydryl functionalisation (μ+σ) (black, 157.5±34.9 nm), disulphide and nitrobenzoic acid (red, 166.1±46.6 nm) and disulphide and CYY functionalised particles (blue, 156.6±43.5 nm), recovery of sulfhydryl after addition of TCEP to disulphide and nitrobenzoic acid functionalisation (orange, 162.1±36.6 nm), and to CYY functionalisation (green, 160.3±40.9 nm);

FIG. 15 shows results of perchlorate Raman spectra. Averaged Raman spectra of PBS (black, n=234) and 200 nm polystyrene beads (red, n=300), each supplemented with 50 mM sodium perchlorate. The perchlorate gives a single, clear solution marker peak at 938 $cm^{-1}$;

FIG. 16 shows results of fluorescence analysis of coumarin dye clicking. Copper catalysed click reaction of 3-Azido-7-hydroxycoumarin (Abs/Em=404/477 nm) to 200 nm polystyrene particles functionalised with propargyl amine resulting in fluorescence when forming the triazole product, (n=3, μ±σ) clicking conditions (blue), no change in fluorescence in absence of dye (red) or absence of copper sulphate (green);

FIG. 17 shows results of SPARTA analysis of liposomes, hybrid vesicles and Janus dendrimersomes (mean±s.d.) at 0, 7 and 25 days post-synthesis showing the capability of SPARTA for stability studies over time for particles comprised of multiple lipid and polymer components;

FIG. 18 shows non-negative least squares analysis of SPARTA spectra showing component scores for individually trapped hybrid vesicles. Consistent scores were obtained for the populations immediately after synthesis and at day 7. By day 25, these particles appeared to drop in trapping efficiency and had consistently higher lipid to dendrimer score ratios, which indicate changes in particle stability;

FIG. 19 shows SPARTA spectra of EVs (mean±s.d.) derived from non-malignant breast epithelial cell line MCF10A (green, n=151) and two breast cancer cell lines MDA-MB-231 (red, n=84) and JIMT1 (blue, n=169); and FIG. 20 shows A) PLSDA multivariate analysis of SPARTA measurements on EV derived from non-malignant breast epithelial cell line MCF10A (green, n=151) and two breast cancer cell lines MDA-MB231 (red, n=84) and JIMT1 (blue, n=169), and B) PLSDA component pseudo-spectra LV1 and LV2;

FIG. 21 shows results of SPARTA analysis of cubosomes with variable PA/PC ratios (mean±s.d.) indicating a clear presence of the tertiary amine peak at 718 $cm^{-1}$ from PC which gradually decreased with increasing PA composition; and FIG. 22 shows how SPARTA can be used for measuring enzyme kinetics as part of the on-line dynamic reaction monitoring functionality. Cubosomes were spiked with 80, 40 or 20 U/mL. The conversion can be visualized with SPARTA on a single particle scale showing enzyme concentration dependent conversion of PC to PA, including endpoint controls (15% PC to 15% PA).

Described herein is a comprehensive nanoparticle analysis system or platform based on Raman spectroscopy configured to provide size and/or composition analysis on a single particle basis. The size and composition analysis may be performed simultaneously. Raman spectroscopy is a well-established characterisation technique that can provide label-free compositional data based on inelastic scattering of incident laser photons and has been applied for samples ranging from simple powders to cells, when using complex 3D imaging[9]. The obtained Raman spectrum gives a molecular fingerprint of the chemical constituents of the sample. To interrogate individual particles without confounding contributions of substrates, Raman spectroscopy can be applied in combination with optical trapping. A particle can be levitated or trapped due to the radiation pressure created by the laser focus[10,11]. Nanoparticles in the Rayleigh limit (r<<λ) are trapped due to a difference in polarisability of the particle compared to the solution, leading to a dipole gradient force. This force scales with laser intensity and decreases with increasing distance from the focal volume, which directs the particle into the optical trap at the focal point of the laser[12]. For Raman spectroscopy this is ideal, as the laser creating the particle trap can simultaneously be used to acquire a Raman spectrum of the particle. This has sparked a wide range of studies investigating various micro- and nano-sized particles such as microdroplets[13,14] and silicon nanoparticles[15]. Of particular interest is the use of Raman spectroscopy to analyse the composition and heterogeneity of vesicular structures posed for drug delivery systems, such as liposomes[12,16] and polymersomes[17,18]. These particles can be made from a wide range of amphiphilic molecules, to obtain vesicles with a variety of compositions, size ranges and physical properties[16,19]. It has previously been shown that Raman spectroscopy can be used successfully to analyse the composition of polymersomes a few micrometers in size[20]. However, despite recent advances, the use of Raman spectroscopy for single particle analysis suffers from a major limitation, namely the fact that the particles need to be manually trapped inside the laser or lifted from a substrate[21,22]. This significantly limits the number of particles that can be analysed as the process is both slow and labour-intensive. The very limited particle throughput also obstructs any investigation of composition heterogeneity with sufficient statistical power.

In addition to particle compositional analysis, prior studies have shown the possibility of investigating dynamic events or reactions occurring on the particle surface, by monitoring the spectrum of optically-trapped particles over an extended time. Examples include observation of polymerization reactions[23], solid phase particle assisted peptide synthesis[24] or measurements of analyte concentrations in liposomes[25]. Further analysis of trapped particles includes the investigation of the influence of optical trapping forces on micrometer sized liposomes through the addition of a solution marker such as perchlorate ions[12]. In addition, perchlorate ions have been employed as an internal standard to measure surrounding solute concentrations[25] and has been shown to be impermeable to lipid membranes[26].

To address the imperative need for large scale integral size and composition characterisation of single nanoparticles, the inventors have developed an analysis system or platform for Single Particle Automated Raman Trapping Analysis (referred to herein as SPARTA). SPARTA enables high throughput, routine analysis of individual nanoparticles in solution without any need for particle labelling or modification. Here, we demonstrate a thorough analysis of the composition of liposomes and polymersome systems, as well as the ability to resolve mixtures and investigate particle heterogeneity using the SPARTA platform. In addition to particle compositional analysis, we show that the SPARTA platform is ideally suited for monitoring sequential functionalisation of polystyrene nanoparticles, as well as tracking the dynamics of a click reaction on the particle surface. Lastly, by taking advantage of the high-throughput measurement capability, we demonstrate that perchlorate addition can be used in a radical new way, to allow single particle sizing of the trapped particles. SPARTA opens up a plethora of exciting new applications to analyse inter and intra sample heterogeneity, complex mixtures, on-line reaction monitoring and integrated simultaneous sizing of single particles in high detail.

FIG. 1 shows a high level schematic diagram of an automated particle capture system for particle analysis, particularly applicable to Raman spectroscopic analysis. The system 1 comprises a source 2 of electromagnetic radiation, which in this example is a light source and more preferably a laser. A dichromatic mirror 3 directs laser radiation 4 towards a sample 5 for analysis via a focusing element 8. Electromagnetic radiation 6 from the illuminated sample 5 is directed to a detector 7 via the dichromatic mirror 3. Elastically scattered radiation from the sample 5 at the wavelength of the laser beam is filtered out by a suitable filter (not shown) at the detector 7 and Raman scattered radiation passes to a detection device of the detector 7.

A substrate 10 is provided to receive the sample 5 for analysis, which may be covered with a suitable cover 11, e.g. to limit evaporation of the sample. The cover 11, if used, is transparent to the electromagnetic radiation 4, 6. In another example, the cover may comprise the focusing element 8 which may be the objective lens of the system so that the sample may be in direct contact with the objective (e.g. water immersion). The sample 5 comprises any fluid medium 12 capable of conveying particles 15 for analysis therein. The expression 'capable of conveying' is intended to encompass any fluid medium 12 that is capable of providing suspension of the particles 15 within the medium whilst allowing movement or transport of the particles within, or by, the fluid medium 12 itself. For example, movement/transport of the particles 15 may be by diffusion within the medium 12 or may be by flow of the medium or a combination of both. In the example shown, where the volume of the sample 5 is generally static on the substrate 10, diffusion may be a primary mechanism for movement of the particles 15 relative to an impinging beam 4. In other arrangements, a substrate 10 may be configured for microfluidic control of the movement of fluid medium 12 and particles 15 suspended therein, e.g. using a microfluidic channel to move samples into position. Preferably, the fluid medium 12 is a liquid. The liquid may be a "non-opaque" or "non-heavily scattering" liquid such as water or a water-based buffer (e.g. phosphate buffered saline or 4-(2-hydroxyethyl) piperazine-1-ethanesulfonic acid) possibly with the addition of low amounts of solvent (e.g. ethanol or dimethylsulfoxide).

A control system 16 is coupled to the laser 2 and to the detector 7 to enable functionality that will be described below.

Figure 2:
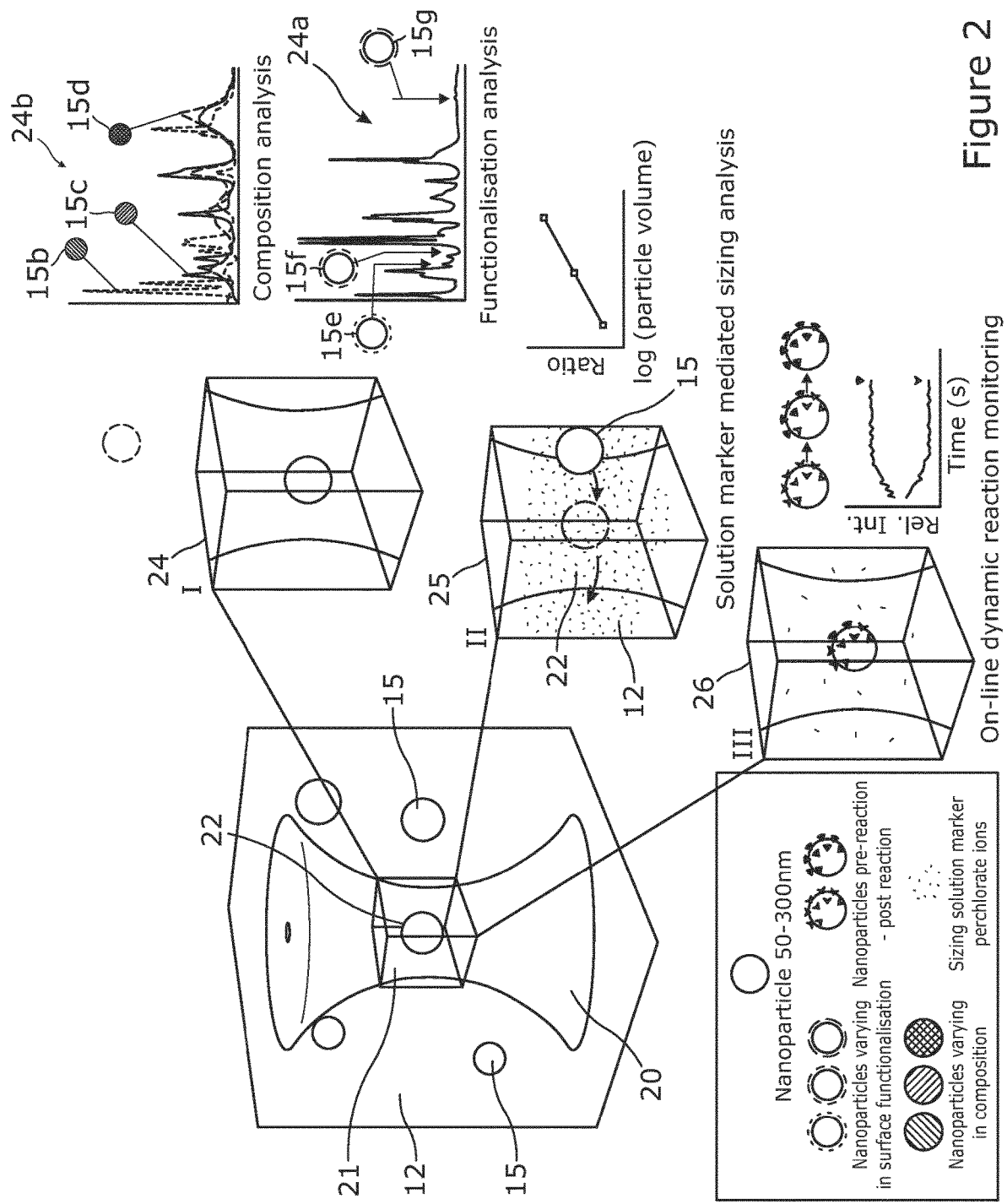
FIG. 2 shows a schematic overview of the functionalities of the system of FIG. 1.

As seen in FIG. 2, the focused electromagnetic radiation beam (e.g. laser beam 20) passes through the medium 12 in which particles 15 are suspended. The beam 20 has a waist portion 21 at its focus which defines a particle capture zone 22 in which a particle 15 can be retained using an optical trapping effect, or single-beam gradient force trapping effect. The highly focused beam 20 provides an attractive or repulsive force dependent on e.g. a refractive index mismatch to physically hold and move microscopic dielectric objects, such as the particles 15. For nanoparticles with diameters smaller than the wavelength of the trapping beam the mechanism may be understood as being based on dipole absorption and reradiation of the light.

Figure 3:
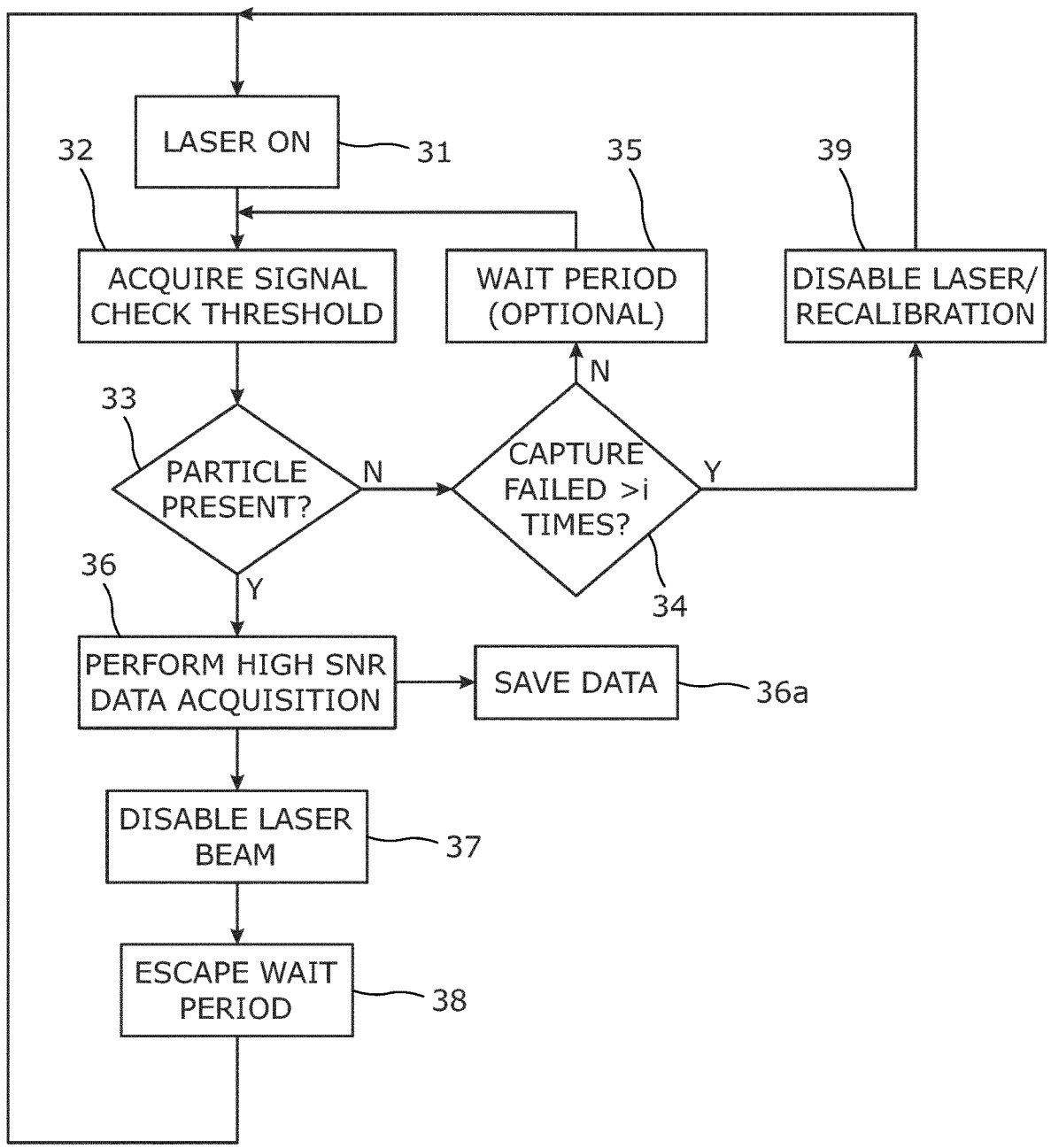
FIG. 3 shows a flow diagram illustrating a process flow for automatic particle capture and data acquisition using the system of FIG. 1.
Figure 4A:
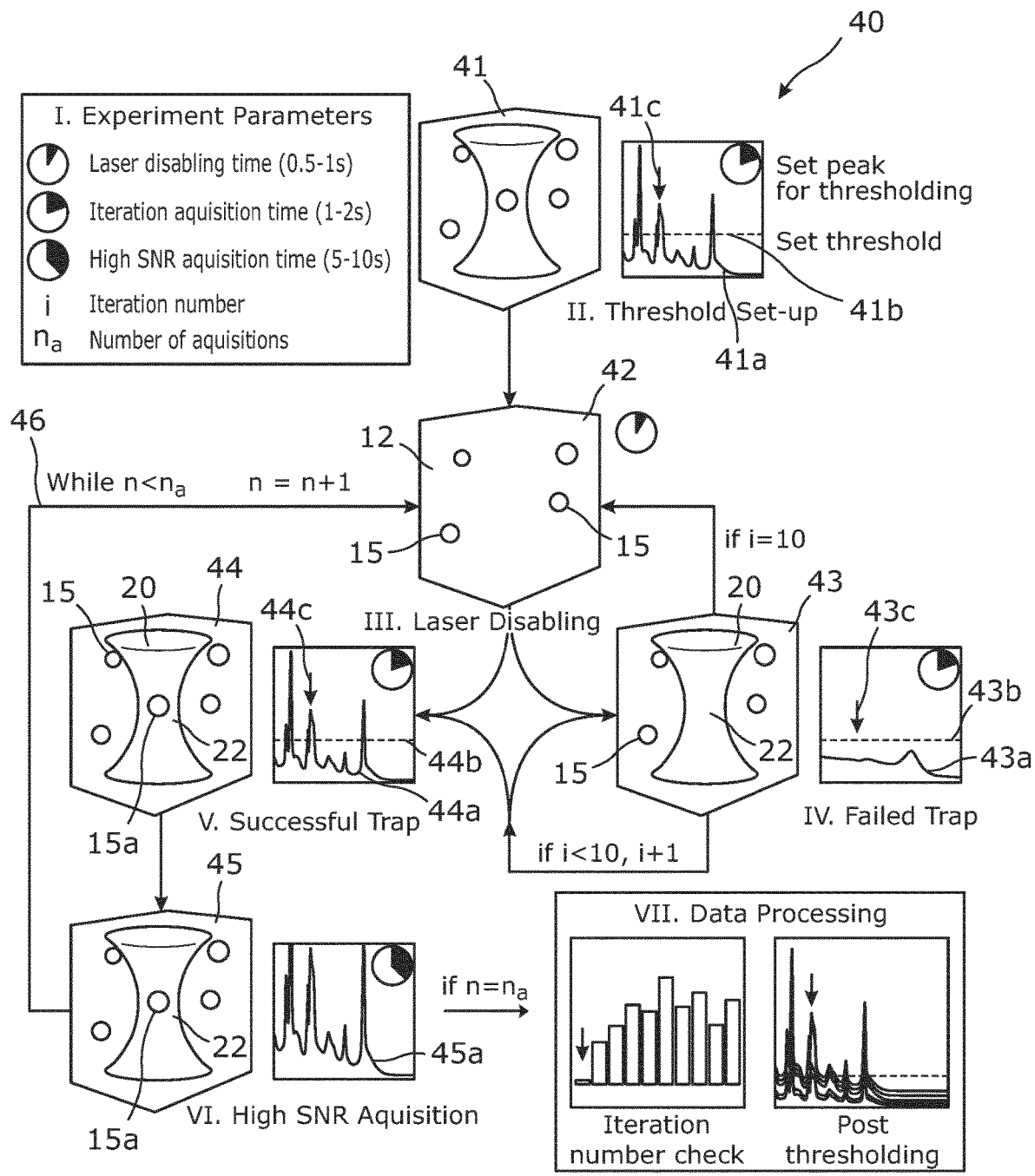
FIG. 4 shows a schematic diagram of various stages in the process flow of FIG. 3.
Figure 4B:
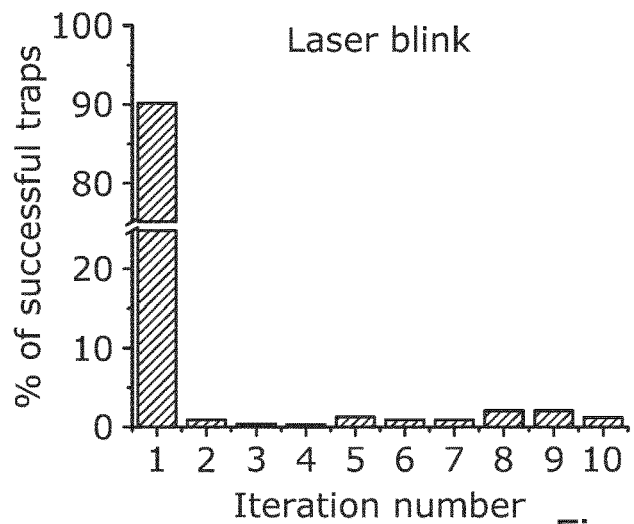
Figure 4C:
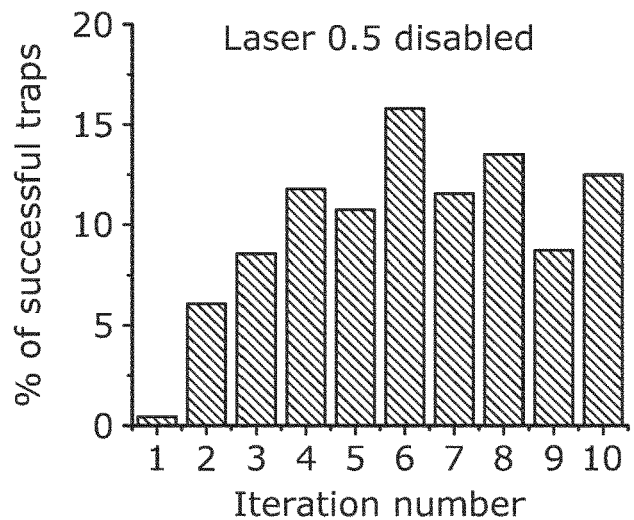
Figure 4D:
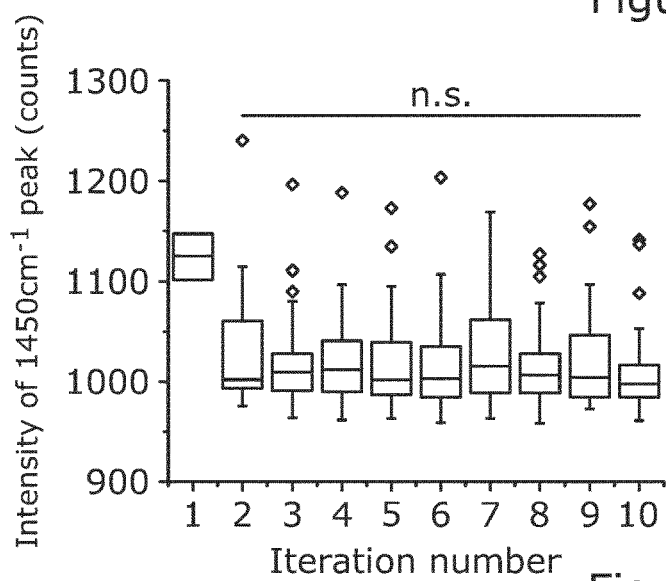

An important aspect is how to provide an automated process for particle capture, particle presence verification, and data acquisition from the captured particle 15, not just for an individual particle but repeatedly for tens, hundreds or thousands of particles in succession. FIG. 3 shows a process flow for automatic particle capture and data acquisition, and FIG. 4 shows a schematic diagram of various stages in the process flow.

In a first step, the electromagnetic radiation beam 20 (hereinafter exemplified as 'laser beam' 20) is switched on and focused on the sample 5 to define the particle capture zone 22 at the beam waist 21 (step 31). A Raman scattered radiation signal 6 is detected at the detector 7 in a first data acquisition procedure (step 32). At least a portion (e.g. a spectral portion) of this Raman signal is tested against a threshold to determine whether a particle 15 has been captured or not (step 33). Details of the particle capture test are discussed hereinafter. If a particle is not detected from the Raman signal, and if particle capture has not failed more than a predetermined number of times (step 34), the process repeats to test the Raman signal against the threshold (step 32). There may be a short capture wait period (step 35) between successive ones of the first data acquisition procedure (step 32) to allow time for a particle 15 to move into the particle capture zone 22 by the prevailing transport mechanism, e.g. diffusion of the particles 15 within the medium 12.

If, at step 33, a particle 15 is detected with the Raman signal, a second data acquisition procedure is effected (step 36). The second data acquisition procedure may also comprise detecting a Raman scattered radiation signal. Preferably, the second data acquisition procedure (step 36) comprises a much higher quality data signal acquisition procedure than the first data acquisition procedure (step 32). The higher quality data capture may comprise, for example, any one or more of: (i) an extended period of data capture to obtain a higher signal-to-noise ratio than that of the first data acquisition procedure, (ii) gathering of spectrally extended data, i.e. over a greater frequency bandwidth or selection of frequencies, (iii) collection of data using different modalities, e.g. modalities other than Raman spectroscopic signals; (iv) multiple periods of data capture for averaging; (v) altered laser power for increased signal to noise ratio; (vi) collection of data which is added to/combined with the data of the first data acquisition procedure to thereby improve the signal to noise ratio of the data from the first data acquisition procedure. Such other modalities could include, for example, fluorescence signals/spectra, absorption signals/spectra, and other optical spectroscopy techniques. The data acquired during the second data acquisition procedure 36 may be stored (step 36a) for later analysis with subsequently captured data sets, or may be processed/analysed on-the-fly in real time or pseudo-real time.

After the second data acquisition procedure (step 36), the beam 20 is disabled (step 37) to allow the captured particle 15 to escape from the particle capture zone 22, during an escape wait period or escape delay period (step 38).

In one arrangement, the first data acquisition procedure (step 32) comprises gathering Raman spectral data for a period of between 1 and 2 seconds and the second data acquisition procedure (step 36) comprises gathering Raman spectral data for a period of between 5 and 10 seconds. These times can be adjusted to optimise for various factors, e.g. the intensity of the Raman scattering of the particle due to composition or size, and the required signal to noise ratio of the resulting data or any other external constraints or requirements of the resulting data.

More generally, the first data acquisition procedure (step 32) may comprise gathering Raman response signals to an extent (e.g. over an integration period) that is sufficient to enable detection of the presence of a particle by sensing its spectral profile above a threshold compared to a spectral profile that is obtained without a particle being present. The spectral profile may comprise an amplitude and/or shape of a peak or multiple peaks, an area under a peak or one or more peaks, an area under one or more portions of the Raman spectrum, a shape of at least a part of the spectrum, or some other feature.

The process loop (steps 31-35) may repeat a predetermined number of times i (e.g. over a number of sampling periods), tested at step 34. The number of iterations permitted can be determined according to a number of factors, and a failure to detect a particle within the predetermined number of iterations (step 39) may trigger a restarting of the whole process or a recalibration process, to be described later.

The disabling of the beam 20 in step 37 may be effected by direct control of the laser, e.g. to power the laser on and off, or by shuttering or otherwise attenuating the beam. In this regard, particularly in step 37, it is noted that it may not be necessary to completely shut off the beam 20, only to reduce or attenuate the beam to a sub-capture level, i.e. an intensity level insufficient to retain a particle in the particle capture zone 22 by the beam gradient force trapping effect. This might be effected by a modulation device (not shown), e.g. inserted into the beam path emerging from the laser and before the mirror 3 (FIG. 1).

In some instances, the data captured during the first data acquisition procedure may have sufficient signal-to-noise ratio to also serve for the requirements of the second data acquisition procedure. In such an instance, the system may be configured to use/acquire the data of the first data acquisition procedure as the required high signal-to-noise ratio data in place of the second data acquisition procedure (step 36) and save this data (step 36a) for later analysis or real time processing.

FIG. 4 illustrates more detailed aspects of the procedure shown in FIG. 3. Image 42 represents the sample 5 comprising medium 12 and particles 15 dispersed within it. Image 43 represents the beam 20 having failed to capture a particle in the particle capture zone 22. This failure is indicated by the failure of a Raman signal 43a detected by the detector 7 to achieve a predetermined threshold 43b at a predetermined band 43c in the Raman spectrum 43a, which would be indicative of the presence of a particle. By contrast, image 44 represents the beam 20 having captured a particle 15a in the particle capture zone 22 which is indicated by the detection of a Raman signal 44a rising above the threshold 44b at the predetermined band 44c in the Raman spectrum. Image 45 represents the second data acquisition procedure 36 during which the captured particle 15a is held within the particle capture zone 22 for an extended period during which a higher quality data signal 45a acquisition takes place, e.g. having a higher signal to noise ratio and or other properties as discussed above. Control path 46 back to image 42 represents the disabling of the laser beam 20 and the return to the start of the particle capture process to capture a new particle after release of the originally captured particle.

Set-Up/Calibration

Before commencement of a particle capture process, the system 1 may be set-up with a suitable calibration procedure to determine the particle capture detection conditions of step 33. This set-up may be performed manually or using an automated process. The particle capture detection conditions may rely on a single detected feature of the Raman spectrum or more than one detected feature. As shown in FIG. 9, a set-up/calibration process carried out on a sample 5 starts with entering a number of collection parameters into the system 1 (step 91). These collection parameters include (i) a rapid collection integration time period, i.e. the time period for collection of data during the first data acquisition procedure of step 32 (e.g. 1-2 seconds); (ii) a laser disable time, i.e. the escape wait or delay period of step 38 (e.g. ≥0.5 seconds); (iii) a high SNR integration time, i.e. the time period for collection of data during the second data acquisition procedure of step 36; and (iv) a number of trap attempts, i.e. the number of iterations i permitted of the loop of steps 31-35 (e.g. 10).

A set-up trapping sequence is then initiated (step 92) in which the system repeatedly tries to capture a particle until a particle is captured. This capture may be verified e.g. by observing a significant change in the spectrum obtained, e.g. in a part of the Raman response spectrum known a priori to be indicative of the target particle. This can be verified e.g. by appearance of spectral signal/peaks significantly different from the background signal of the sample 5, or by recognition of a priori known/anticipated peaks (e.g. appearance of known polystyrene peaks when attempting to trap polystyrene particles). The spectra may then be examined to determine an optimum peak (e.g. 41c of FIG. 4) or other spectral feature that best characterises the presence of a particle in the particle capture zone, e.g. a particular Raman spike 41c. In other words, the spectral feature selected is one that differentiates between a Raman response of a target particle to the beam 20 and a Raman response of the particle-conveying medium without a target particle to the beam. The spectral feature selected may comprise a peak amplitude, multiple peak amplitudes, an area under one or more portions of the spectrum, a profile of at least a part of the spectrum, or some other feature (step 93). A threshold level 41b above a baseline is then determined (step 94) that lies between the value of the peak indicative of particle capture and the normal level of the spectrum without particle capture (e.g. spectrum 43a). The automated trapping sequence of FIG. 3 may then be initiated (step 95).

An alternative set-up/calibration process which utilises more than one threshold for detecting particle capture is shown in FIG. 10. Process steps indicated by boxes 100 to 104 are correspondent to the steps 90 to 94. In this process, following the establishment of a first threshold in step 104, the laser may be disabled (step 105) to release the first test particle, a new particle is captured (step 106) and a new spectral feature is sought and selected (step 108) that characterises the presence of a particle in the particle capture zone, i.e. having a particle capture signature that differs from that of step 103. A second threshold level above a baseline is then determined (step 109) for that feature, and the automated trapping sequence of FIG. 3 may be initiated (step 95).

An alternative and automated set-up/calibration process is shown in FIG. 11. In this process, steps 110, 111 correspond to steps 90 and 91 of FIG. 9. In this automated process, manual verification of the capture of a particle is not required. A trapping sequence is initiated at step 112 and a data acquisition procedure is performed to acquire a spectrum (similar to steps 31 and 32 of FIG. 3). This acquired spectrum is compared with a reference spectrum previously obtained from a sample of the medium without particles. An automated spectral subtraction of the reference spectrum from the acquired spectrum is performed (step 113). If the area under the spectral subtraction is greater than a noise threshold of the reference spectrum, a successful trap is assumed (step 114) and a threshold 41b may be established from some or all of the acquired spectrum, e.g. where it differs most strongly from the reference spectrum. The automated trapping sequence of FIG. 3 may then be initiated (step 115).

As broadly outlined above with reference to FIG. 1, the system is based on a high-end confocal Raman spectroscopy set-up where a laser 2, detector (camera and spectroscope) 7 are simultaneously controlled by the control system 16 for automated single particle trapping and Raman spectral acquisition. To enable the application of SPARTA for comprehensive particle analysis, three distinct modes of operation may be deployed, as illustrated schematically in FIG. 2.

The first mode illustrated by image 24 comprises functionalisation and composition analysis 24a, 24b by acquisition of high quality Raman spectra for single particles in solution, allowing investigation of their composition and verification of the presence of specific functionalisations, indicated by the range of particles 15b-15g, e.g. with 15b,c,d having different compositions (as shown by the different colour) and with 15e,f,g having the same core composition but different functionalities on the surface (as shown by the different colour corona). The SPARTA system 1 has the key advantage of enabling automated analysis of hundreds of particles, compared to existing manual systems where each particle must be captured using conventional manual techniques. The automation and up-scaling of the number of particles analysable enables a means to analyse particle variance both on a single particle basis and at population level for complex mixtures of particles.

The second mode of the SPARTA system 1 illustrated by image 25 is solution marker mediated sizing analysis. By combining the high throughput single particle analysis with a perchlorate ion standard, the inventors have shown that the size of the particle 15 in the particle capture zone 22 can be estimated simultaneously when acquiring its compositional information. A particle 15 entering the particle capture zone 22 displaces its volume of perchlorate ion solution (corresponding to the medium 12) from the particle capture zone 22. By measuring the decrease in perchlorate signal in the Raman spectrum, relative to trapping particles of known size, a calibration curve can be obtained to relate the perchlorate signal in the Raman spectrum to the size of the particle 15 in the particle capture zone 22, provided it is smaller than the confocal volume of the beam 20. This enables particle sizing on a single particle basis with the simultaneous collection of compositional data, allowing direct acquisition and correlation of particle size and composition, where hitherto a combination of several analysis techniques had to be used and size and composition could not be compared on a per particle basis. Thus, in a general aspect, the size of a captured particle may be determined by measuring a decrease in a spectral response signal that is characteristic of the particle-conveying medium without a particle therein, when a particle capture is detected. The spectral response signal that is characteristic of the particle-conveying medium without a particle therein may comprise the spectral response signal of a solution marker within the particle-conveying medium where the solution marker has a different spectral response than that of the target particles.

The third mode of the SPARTA system 1 illustrated by image 26 is on-line dynamic reaction monitoring; tracking the progress of a dynamic event on single particles. This can be achieved by either holding a single particle in the particle capture zone for the duration of a reaction, or by trapping a new particle at subsequent time points to compare reaction progress on a particle-by-particle basis. The single particle sampling aspect of this technique permits investigation of reaction kinetics, identifying if the reaction occurs simultaneously at the same rate on each particle, or on specific single particles at any one time, as would be the case for reactions limited by catalyst availability. These results can further be correlated to bulk dynamics, which can be tracked with conventional methods.

To facilitate the aforementioned areas of application, extensive control over the trapping process is provided, as discussed above in relation to FIG. 4. Prior to spectral acquisition, a user may define several parameters as part of a set up and/or calibration procedure, e.g. through a software interface. These parameters may include the number of acquisitions ($n_a$) of the second data acquisition procedure (step 36) required (e.g. the number of particles for which data capture is required), the number of times for iteration to capture a particle (i.e. the number of iterations of process steps 31-35), parameters of the second data acquisition procedure (e.g. duration of the high SNR acquisition) and the duration of laser disabling (step 37) between each particle trapping.

To allow for automated particle capture recognition, a calibration process illustrated at image 41 (FIG. 4) may be performed. An initial particle 15$a$ may be captured and a characteristic peak 41$c$ in the spectrum 41$a$ is selected, along with its median height, or height above a noise/background level, as a threshold 41$b$. This provides the test for particle capture (step 33), if the chosen peak 44$c$ is above the threshold intensity 44$b$ during an iteration acquisition. Next, the acquisition iteration loop is initiated (steps 31 to 35). If the thresholding peak is not above threshold intensity 43$b$ in the iteration spectrum 43$a$, a maximum of 10 iterations may be performed. If the peak signal 43$c$ fails to exceed the selected threshold 43$b$ during any of these iterations, particle capture is registered as unsuccessful and the laser may be momentarily disabled (step 35$a$). When a successful particle trap is recognised (image 44), a longer acquisition is taken to obtain a high SNR spectrum (step 36) of the captured particle 15. The beam is momentarily disabled by turning off the laser (step 37) to allow the particle to diffuse away. This iteration process allows for a much higher turnover of trapping attempts and acquisitions, since it only permits the acquisition of longer, high SNR spectra when particle capture is successful. For each particle captured, the acquisition parameters, time and iteration number may be recorded in a trapping log file alongside the high SNR spectral data, to be used for verification and post processing as indicated at image 47. The iteration number is used to verify an adequate laser disabling time in an iteration number check. The spectra can also be put through post thresholding to pick out any 'false positive' traps if the thresholding intensity was initially set too low. Conventional Raman spectral processing can be performed afterwards, including cosmic spike removal, baseline subtraction and normalisation.

An adequate laser disabling time (step 37) ensures momentary disengaging of the particle trap to allow the particle to diffuse away and may be important for avoiding duplicate analysis of a particle. If the disabling time 37 is too short, e.g. only blinking the laser, it results in more than 90% of the successful traps occurring at the first iteration, as seen in FIG. 4$b$. This represents a high likelihood that the same particle is being repeatedly trapped before it can diffuse away. A laser disabling time between 0.5 and 1 second is found to be sufficient to ensure that <1% of particle captures are achieved in the first iteration number, as seen in FIG. 4$c$ for a laser disabling time of 0.5 seconds. This is in agreement with diffusion speeds reported in literature[27]. Therefore, a preferred laser disabling time is at least 0.5 seconds. As seen in FIG. 4$c$, peak probability of particle capture occurs at six capture attempts. In addition, it was verified that the iteration number at which a spectrum is acquired does not affect the peak intensity of the spectra, for instance due to fluctuations in the laser power. This was done by comparing the peak intensity of a characteristic peak at 1450 cm$^{-1}$ (CH$_2$ vibration) for traps at each iteration number as seen in FIG. 4$d$. Apart from the traps at iteration number 1, there is no significant impact on peak intensity by the iteration number of the successful trap.

Functionalisation and Composition Analysis

The primary mode of operation for the SPARTA system is single particle functionalisation and composition analysis shown schematically at FIG. 2, images 24, 24$a$, 24$b$. Here, either particles of varying composition (particles 15$b$, 15$c$, 15$d$), or particles with the same core composition but varying surface functionalisations (particles 15$e$, 15$f$, 15$g$) are analysed. This was demonstrated by trapping 1,2-di-palmitoyl-sn-glycero-3-phosphocholine (DPPC) liposomes and liposomes containing 50% deuterated DPPC with respect to their DPPC content referred to as d-DPPC liposomes. In the Raman spectra of the two samples (FIG. 5a) a clear C-D signal can be observed around 2105 cm$^{-1}$ in the spectrum for the d-DPPC liposomes, which is absent for the DPPC liposomes. Due to the high-throughput automated operation, mixtures of particles can be analysed and resolved. To demonstrate this, a 50-50 v/v % mixture of DPPC liposomes and d-DPPC liposomes was made. With SPARTA, hundreds of particles were trapped and the spectra were analysed by a Gaussian mixture analysis based on the histogram of the intensity of the C-D vibration at 2105 cm$^{-1}$. This resulted in a clear bimodal distribution of the histogram (FIG. 5b) covering 44 and 56% of the traps for DPPC and d-DPPC respectively, showing that the mixture can be clearly resolved. Alternatively, the mixture can be resolved by cluster analysis, as can be seen in the Ward's dendogram (FIG. 5c), showing two main clusters of spectra relating to the non-deuterated and deuterated populations. A small deuterium signal was observed in the non-deuterated classed spectra, which possibly resulted from lipid exchange between deuterated and non-deuterated liposomes. As deuterium containing molecules are very strong Raman scatterers[28], only a small percentage of deuterated molecules are required to generate a detectable Raman signal.

Figure 5A:
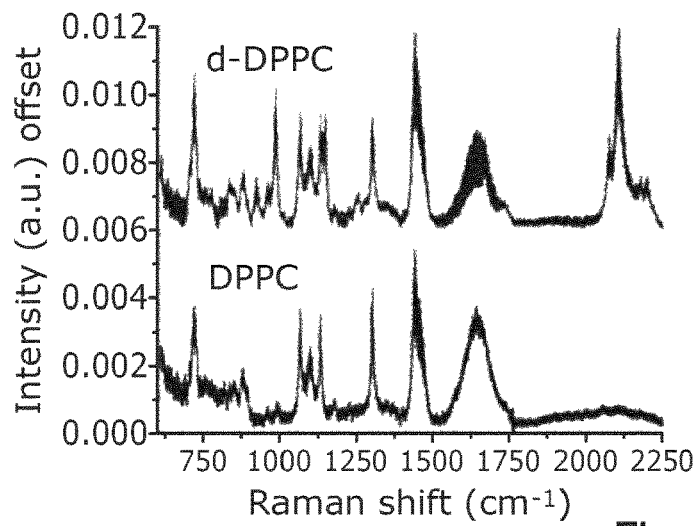
Figure 5B:
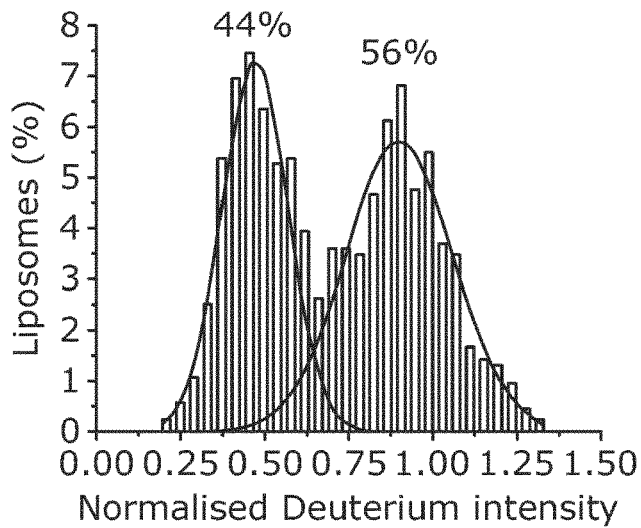
Figure 5C:
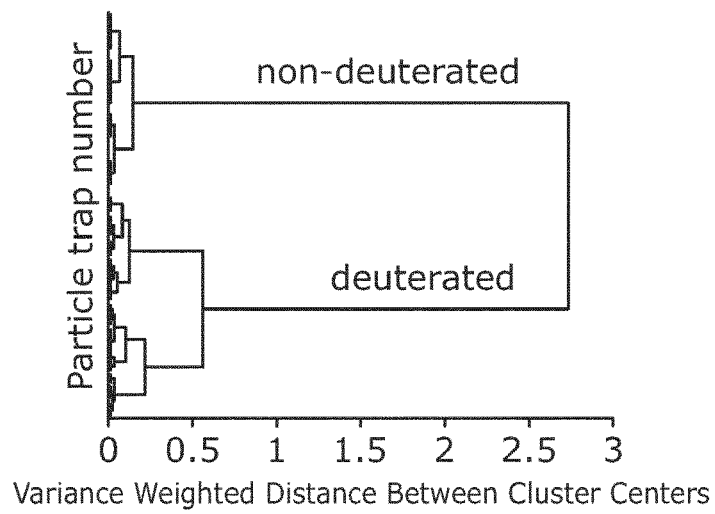
Figure 5D:
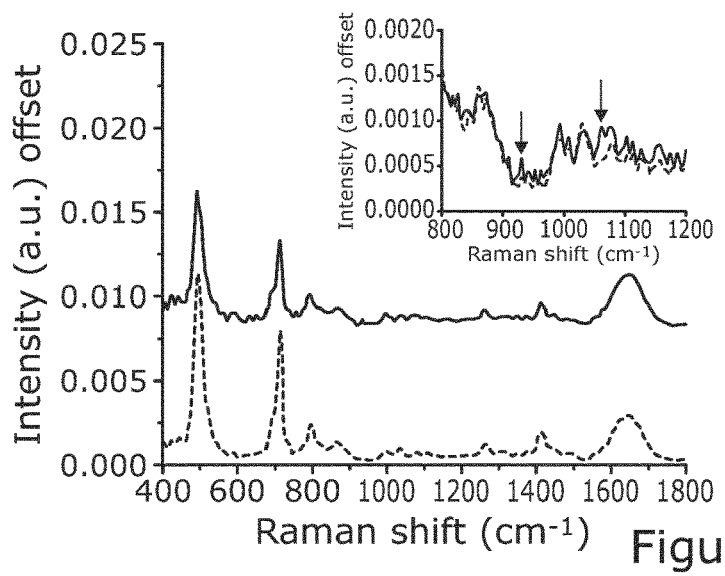
Figure 5E:
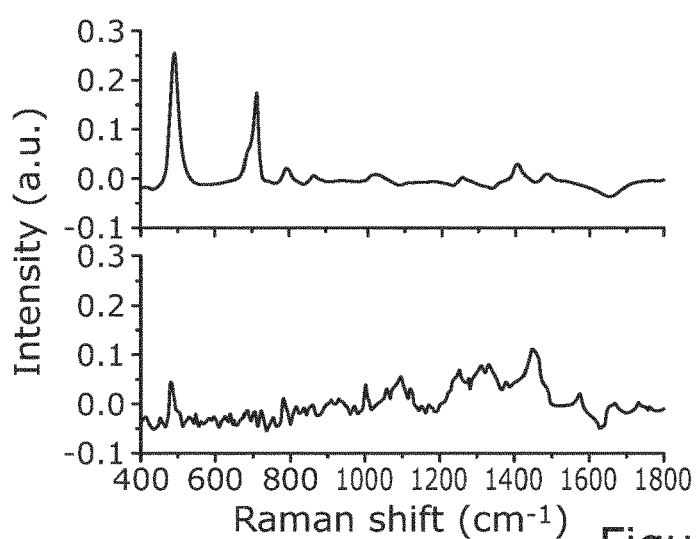
Figure 5F:
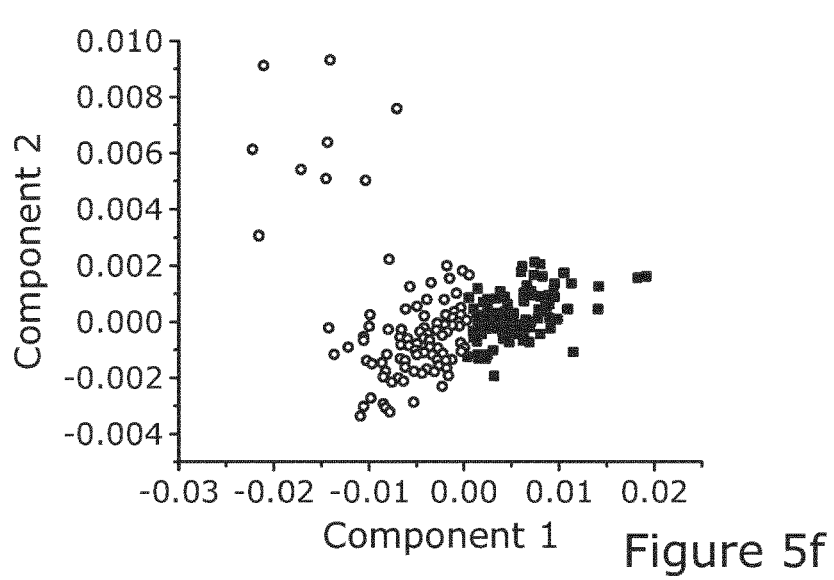

With SPARTA, more subtle differences in composition can also be detected, which is of high relevance in nanoparticle analysis, particularly in the field of nanomedicine, where an exact definition of the composition of nanomaterials is of the utmost importance, yet often elusive. To demonstrate this, we made two formulations of polymersomes, one from poly(2-methyloxazoline-b-dimethylsiloxane-b-2-methyloxazoline) (PMOXA-b-PDMS-b-PMOXA) denoted further as ABA and the other of ABA supplemented with 25 wt. % PDMS-b-Heparin, prepared as described by Najer et al.[29], and termed ABA-Heparin polymersomes. SPARTA analysis of the particles (FIG. 5d) showed characteristic peaks that can be attributed to PDMS (Table 2) for both preparations. In the spectra obtained from the ABA-Heparin polymersomes, additional peaks can be seen and assigned to the saccharide units of Heparin, as indicated by the arrows in the insert. In addition, the average area under the curve for the normalised spectra of the PDMS peaks at 490 and 709 cm$^{-1}$ (Table 2) is lower for the ABA-Heparin polymersomes, with a ratio compared to the ABA polymersomes of 1:0.898. This is in excellent agreement with the theoretical ratio of 1:0.843, corresponding to 83 and 70 wt. % PDMS respectively for the ABA and ABA-Heparin polymersomes, as calculated from the molecular weights and quantities added of the PMOXA-b-PDMS-b-PMOXA and PDMS-b-Heparin block copolymers. Next, we made a 50-50 v/v % mixture of ABA and ABA-Heparin polymersomes and analysed it with SPARTA. These mixtures can be resolved by either an unsupervised classification such as principal component analysis (PCA) or a supervised method such as principal least squares discriminate analysis (PLSDA) where the data from the pure populations is used to build a model and subsequently applied to classify the spectra obtained from the particles in the mixture. A 2 component PCA model (FIG. 5e) shows clear distinction into two clusters, mainly based on variance in PDMS composition. With PCA based Ward's clustering, 49% of the spectra were classified as ABA-like polymersomes, 47% as ABA-Heparin-like polymersomes and 4% were not classified as belonging to either of those clusters (FIG. 5f). Using PLSDA, 38% of the acquired spectra were classified as ABA polymersomes and 62% as ABA-Heparin polymersomes (FIG. 12), based on a model of pure particles that achieved 100% sensitivity and 97.9% specificity for ABA polymersomes by venetian blinds cross validation (10 splits). To verify that either type of polymersome was trapped in a random manner, without time dependence, the scores for PCA component 1 were plotted against the trap number, resulting in a random distribution of polymersome classes over time, proving no bias over time for either composition (FIG. 13).

SPARTA may also be used for investigating functional membrane particles such as dendrimer vesicles. The combination of polymer and lipid components in vesicle membranes may confer added potential for stimuli-responsive particles capable of drug delivery, sensing or other applications where they offer increased toughness, permeability and surface functionality. Hybrid vesicles enable fine-tuning of membrane properties combining more traditional lipids with Janus dendrimers. Challenges are caused by discrepancies between different chemical compositions and sizes. Further, with aims to use such novel particles as delivery vehicles, stability is important.

Here, lipid vesicles, Janus dendrimer vesicles, and hybrid vesicles were all measured with the SPARTA system and methodology using identical trapping parameters. The data in FIG. 17 demonstrates that distinct spectral profiles were obtained from trapping populations of individual vesicles of different, complex formulations including combinations of lipids and polymers. Analysis shows that the trapping efficiency was maintained through the first 7 days for all vesicles, but significantly decreased for the dendrimer and hybrid particles by 25 days. This indicates a detectable change in particle stability between compositions over this time frame.

The term "trapping efficiency" is used to indicate the percentage of initialized trapping acquisitions that resulted in an above-threshold trap signal and the acquisition of a high SNR trap spectrum being recorded. In this experiment, the algorithm initiated 10 attempts to detect if a particle was stably trapped prior to initiating a high SNR trap acquisition. If the signal was not above the threshold, no trap was recorded, and the next acquisition attempt was made. The trapping efficiency therefore indicates how well a sample was reliably trapped using consistent parameters over the course of the initialized acquisitions (typically 200-300 per run).

By comparing the efficiency of trapping the particles at different times using the same trapping parameters, the stability/consistency in the sample over time and between samples can be assessed. As an example, if 200 traps are initialized and 150 traps were successful (i.e. above threshold in one of the 10 attempts and a high SNR spectrum recorded), the trapping efficiency would be 75%. As this is highly dependent on the system parameters (e.g. a low threshold could result in an artificially high efficiency), these need to be identical to compare consistency.

Complex particles comprised of several chemically distinct components were individually measured and component features extracted on a per particle basis. In FIG. 18, the signals have been decomposed into component fits based on non-negative least squares (NNLS) fitting of the known hybrid vesicle components. The fitting indicates on a per particle basis the relative change in stability/composition that occurred over time after synthesis.

Extracellular vesicles (EVs) were also analysed by SPARTA. EVs are complex vesicles consisting of a mixture of lipids, proteins and nucleic acids excreted by virtually all types of cells, and in this example, comprised a mixture of exosomes and microvesicles in the size range of approximately 30-300 nm (with apoptotic bodies up to 1000 nm). Non-malignant breast epithelial cells (MCF10A) and two breast cancer cell lines (MDA-MB-231 and JIMT1) were cultured in vitro and EVs were produced and harvested under serum-free conditions to avoid contamination with bovine serum-derived EVs. The EVs were concentrated via ultrafiltration and purified using size exclusion chromatography to remove soluble protein from the EV fractions. The EVs in a concentration of approximately 1E11 p/ml were analysed by SPARTA, resulting in the detailed compositional spectra of individual EVs shown in FIG. 19.

Using Partial Least Squares Discriminate Analysis (PLSDA), the statistical differences between the EV spectral populations were investigated. With PLSDA, a model is built to try and cluster and classify the assigned EV populations as best as possible and calculate how well a spectrum of a sample EV can be predicted to fall into one of the classes (specificity and sensitivity). These calculations were performed with the PLS toolbox (Eigenvector Research) in Matlab. The PLSDA model is built by constructing pseudo spectra as the latent variables (LV1 and LV2) and assigning a score to each sample spectrum based on the relevant contributions of the LVs to the spectrum.

Figure 20A:
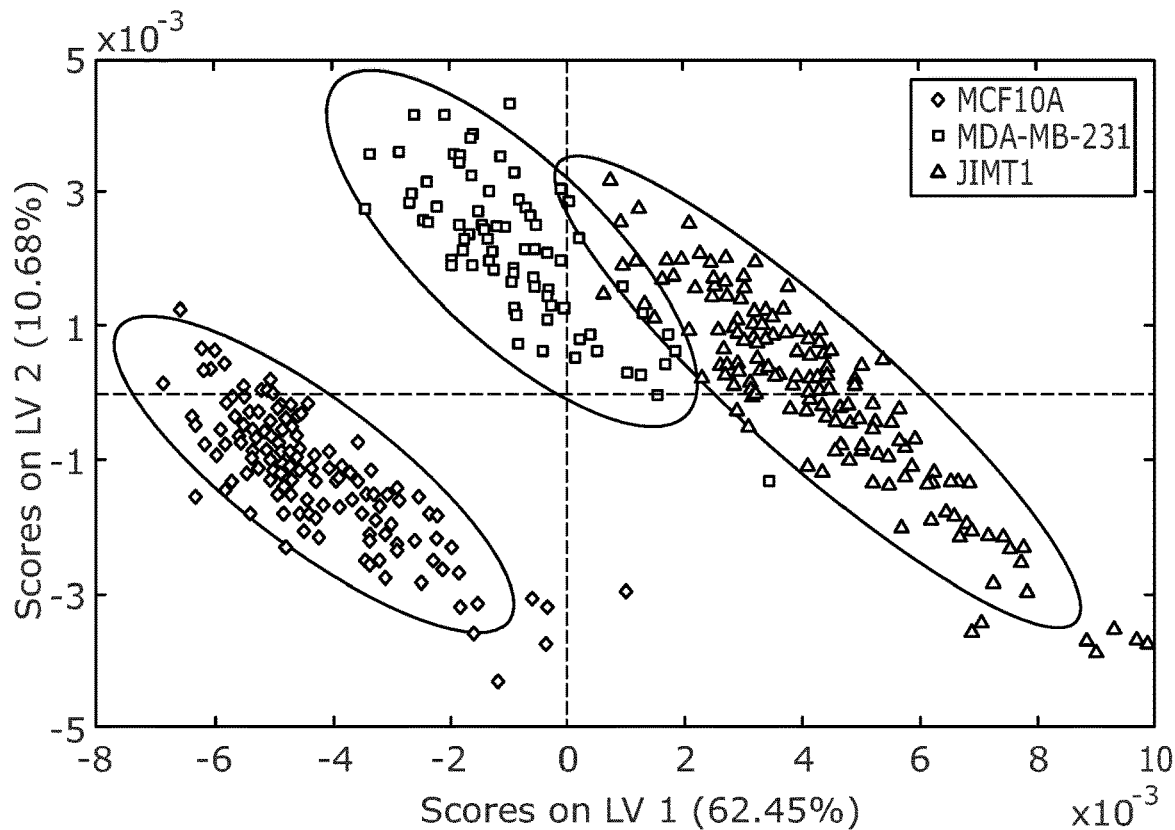
Figure 20B:
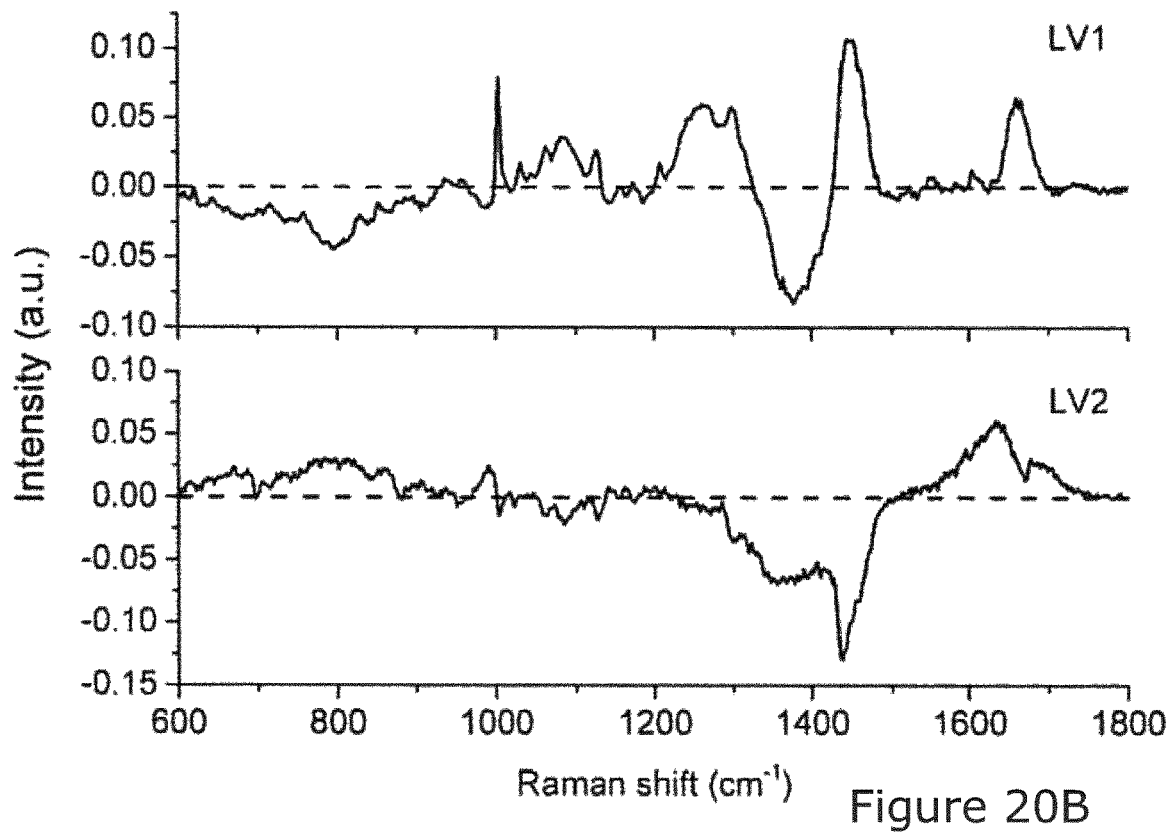

As shown in FIG. 20 there was clustering and separation between the cancerous (MDA-MB-231 and JIMT1) and non-cancerous (MCF10A) EVs, as well as a clear distinction within the cancerous EV populations. In FIG. 20A, the clusters are well separated with the MF10A scoring negative on LV1 and LV2, the MDA-MB-231 mostly negative on LV1 and positive on LV2, and JIMT1 positive on LV1 and mixed on LV2. A positive scoring on an LV means the sample spectrum closer resembles the LV pseudo spectrum as plotted in FIG. 20B. A negative scoring on an LV means the sample spectrum closer resembles the inverse (or negative peaks) of the LV. As such, it can be seen that the difference between the MCF10A and MDA-MB-231 EVs lies in either a negative or positive contribution of LV2. From this analysis it can be determined (for instance) how different the samples are, how well they classify in different clusters, and which spectral features contribute most to this difference.

Furthermore, the cross-validated sensitivity and specificity between the EV clusters was >94% (Table 1). This demonstrates the capability of SPARTA for single EV characterisation.

TABLE 1

| Cross-validated sensitivity and specificity calculations of PLSDA modelling of MCF10A, MDA-MB-231 and JIMT1 derived EVs. | | | |
| --- | --- | --- | --- |
|  | MCF10A | MDA-MB-231 | JIMT1 |
| Sensitivity (CV) | 1.000 | 0.951 | 1.000 |
| Specificity (CV) | 1.000 | 0.943 | 0.983 |

The sensitivity and specificity follow directly from the PLSDA analysis and quantify statistically how well the samples in the clusters can be distinguished. Sensitivity is the ratio between true positives (is class 1 and identified as class 1) and false negatives (is class 1 and not identified as class 1) calculated as:

$$\text{Sensitivity} = \frac{\text{True positives}}{\text{True positives} + \text{False negatives}}$$

The specificity is the ratio between true negatives (is not class 1 and not identified as class 1) and false positives (is not class 1 but identified as class 1) calculated as:

$$\text{Specificity} = \frac{\text{True negatives}}{\text{True negatives} + \text{False positives}}$$

These numbers (occasionally multiplied by 100 to show percentages) are heavily used in the literature to show how well a diagnostic test works, which in the present case relates to how well SPARTA distinguishes cancerous from non-cancerous EVs and between the two cancer types.

Figure 6A:
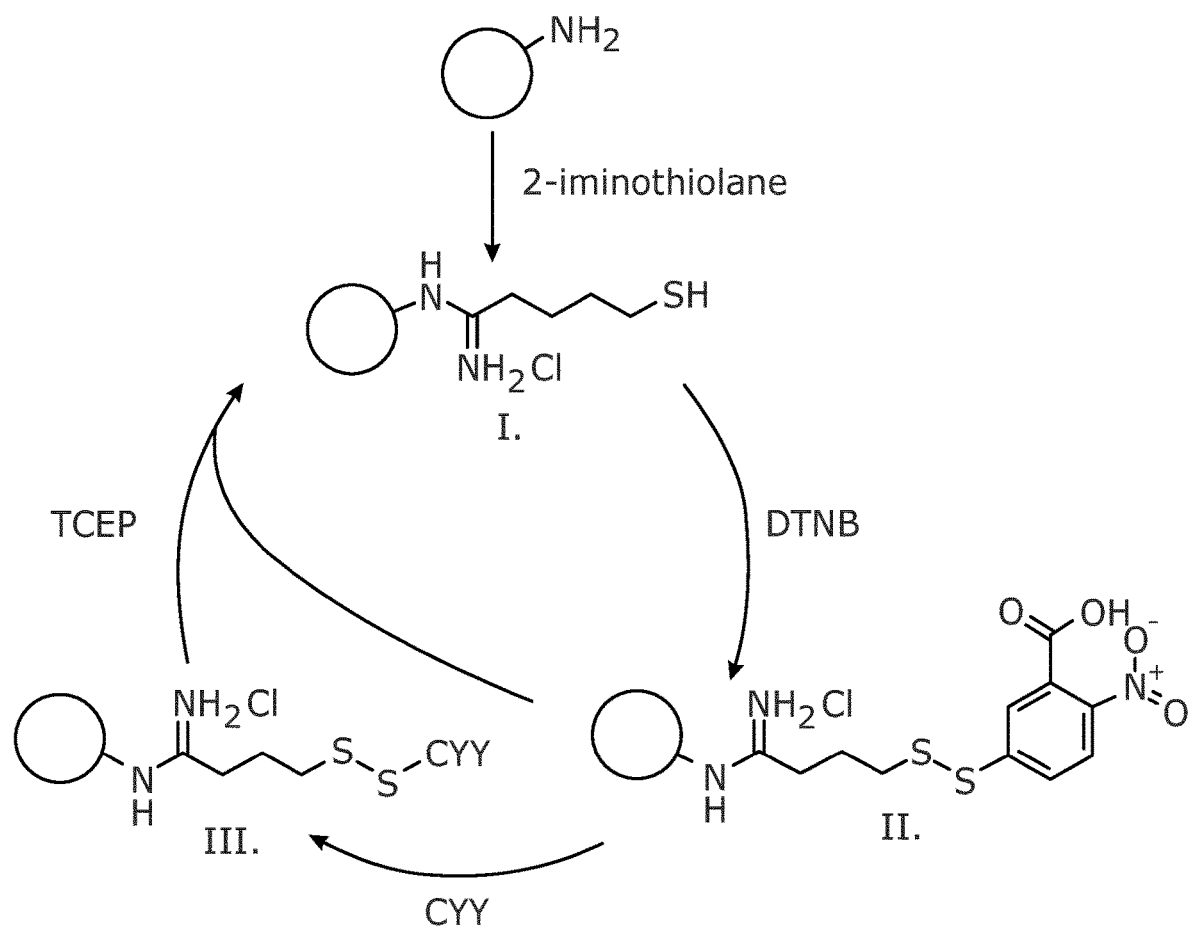
Figure 6B:
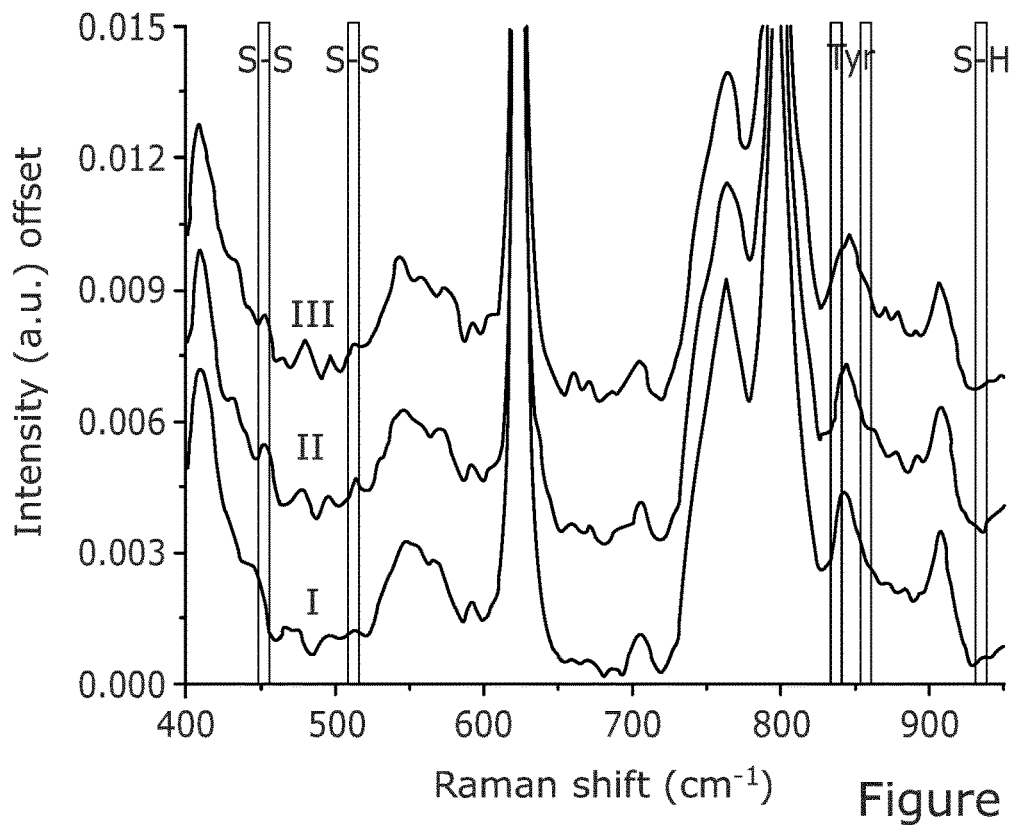
Figure 6C:
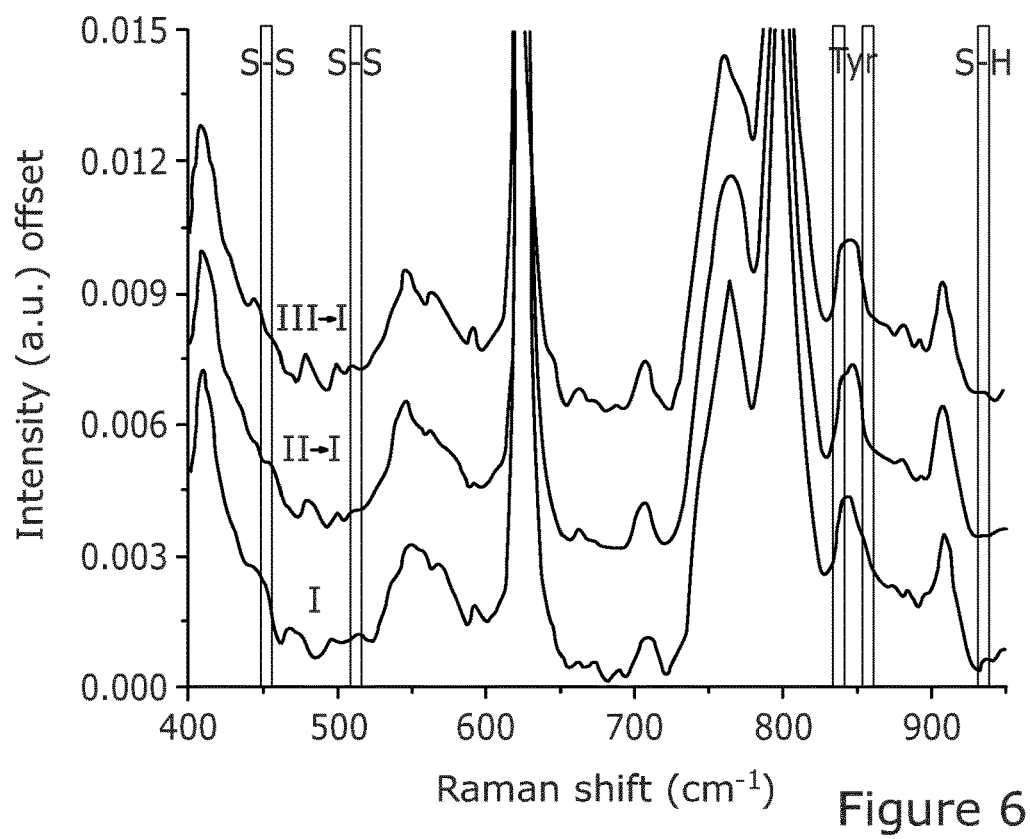

In addition to vesicular systems, the composition and sizing of a wide variety of solid nanoparticles is critically important in a range of applications from drug delivery to catalysis[30, 31]. To validate the use of the SPARTA platform for analysis and verification of successful nanoparticle functionalisation, we devised a model system based on the sequential functionalisation of polystyrene (PS) nanoparticles via disulphide exchange (FIG. 6a). Commercially obtained amine functionalised PS particles with an average size of 200 nm were sulfhydryl functionalised by addition of 2-iminothiolane. After purification by centrifugation and resuspension, we analysed the particles with the SPARTA platform which verified the presence of sulfhydryl, as seen from the signals in the spectra arising from the S-H bend vibration around 936 cm$^{-1}$ (Table 2) (black) (FIG. 6b). Next, we added an excess of 5,5'-dithio-bis-(2-nitrobenzoic acid) (DTNB) which reacted with the sulfhydryl functionalised particles to form disulphide bonds. After further purification, the Raman spectra (red) showed the clear presence of disulphide bonds. These bonds are dynamic covalent bonds and can thus be exchanged upon addition of another moiety containing a sulfhydryl functionality. We demonstrated this by addition of a tripeptide, consisting of cysteine and two tyrosines (CYY), as peptide functionalisation of nanoparticles is a desirable and widely used strategy, especially in the field of drug delivery[32, 33]. The cysteine residue provides a sulfhydryl functionality and the tyrosines exhibit a characteristic Raman peak, due to the aromatic C=C bonds. Upon addition of the peptide to the purified particles, the solution turned characteristically yellow, demonstrating that the 2-nitro-5-thiobenzoate dianion (TNB$^{2-}$) was formed. This indicated that disulphide exchange had occurred and confirmed the specific conjugation of the tripeptide to the particle. After purification, we acquired Raman spectra of the particles, showing the presence of characteristic tyrosine peaks (blue). To complete the cycle, Tris(2-carboxyethyl) phosphine (TCEP) can be added to either disulphide-containing particle solution to recover the sulfhydryl functionalisation (FIG. 6c). At each step the size distribution of the particles was measured by DLS, verifying particle stability during the sequential functionalisation and purification (FIG. 14).

TABLE 2

| Raman peak vibration assignment. | | | |
| --- | --- | --- | --- |
| Figure | Vibration | Raman shift (cm$^{-1}$) | Reference |
| 5 a, b, c | C—D stretch | 2105 | 1 |
| 5 d | Si—O—Si stretch | 490 | 2 |
| 5 d | Si—C sym. stretch | 709 | 2 |
| 5 d | C—C stretch glucose/saccharide | 930 | 3 |

TABLE 2-continued

| Figure | Vibration | Raman shift (cm$^{-1}$) | Reference |
|---|---|---|---|
| 5 d | Glucose/saccharide | 1070 | 3 |
| 6 b, c | S—S stretch | 452, 512 | 4, 5 |
| 6 b, c | S—H bend | 936 | 5 |
| 6 b, c | C═C ring breathing (Tyrosine) | 840, 860 | 3 |
| 8 b, c, d | C≡C stretch (Alkyne) | 2129 | 1 |
| 8 b, c, d | N≡N stretch (Azide) | 2116 | 1 |
| 8 b, c, d | Triazole ring stretch | 1331 | 3, 4 |
| 13 | Cl—O stretch (Perchlorate) | 938 | 6 |

Solution Marker Mediated Sizing Analysis

The second mode of the SPARTA system allows for simultaneous estimation of the particle size inside the trap, alongside the acquisition of a high SNR compositional spectrum. As illustrated at image 25 of FIG. 2, a particle entering the trap displaces the same volume as itself out of the surrounding solution from the confocal volume, leading to a decrease in the perchlorate signal in the measured spectrum. Perchlorate is particularly suitable for this application as it has a single sharp Raman peak around 938 cm$^{-1}$ (FIG. 15). As the polystyrene signal also increases upon increasing particle size inside the confocal volume, the perchlorate signal is best quantified by a ratio contribution to the spectrum according to:

$$\text{Perchlorate ratio} = \frac{A_t - A_p}{A_p}$$

where $A_t$ is the total area under the curve of the spectrum and $A_p$ the area for the perchlorate peak. The ratio will increase when $A_p$ approaches zero (particle completely fills the trap) and go to zero (no particle) once $A_p$ approaches $A_t$.

Figure 7A:
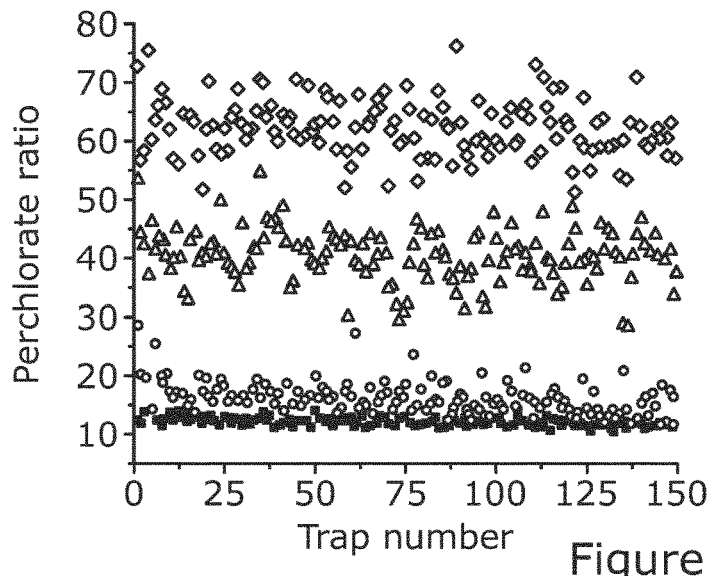
Figure 7B:
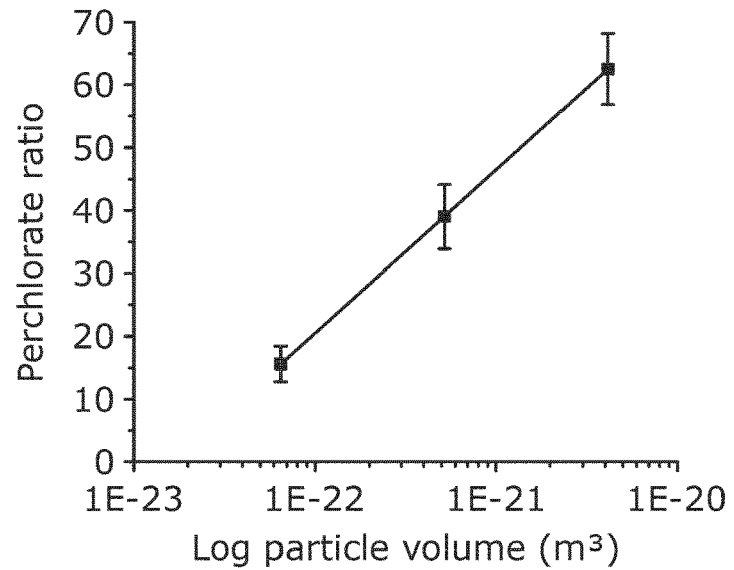
Figure 7C:
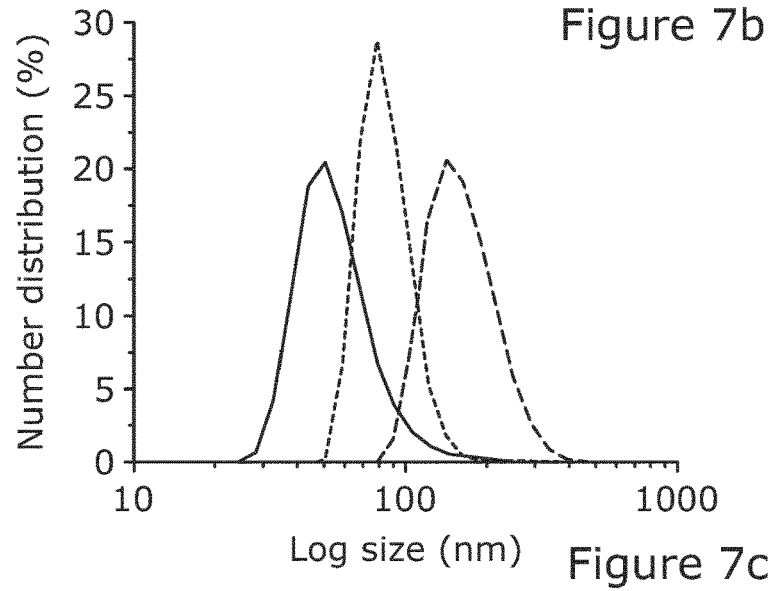
Figure 7D:
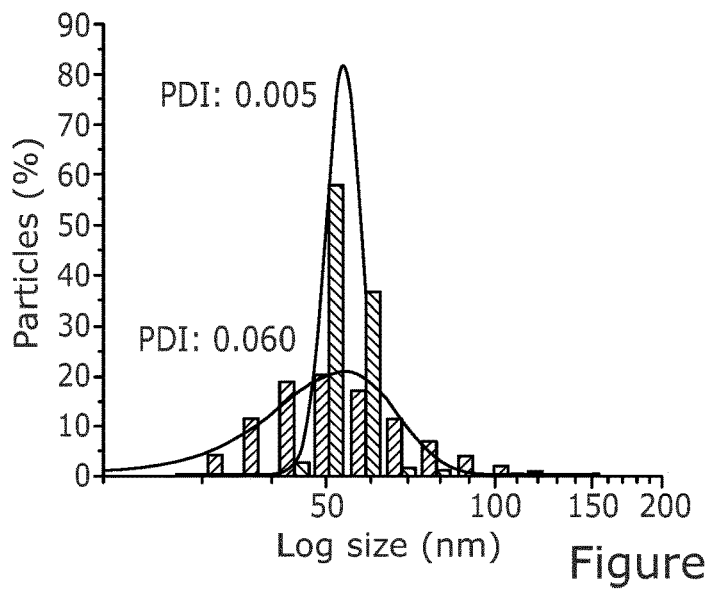
Figure 7E:
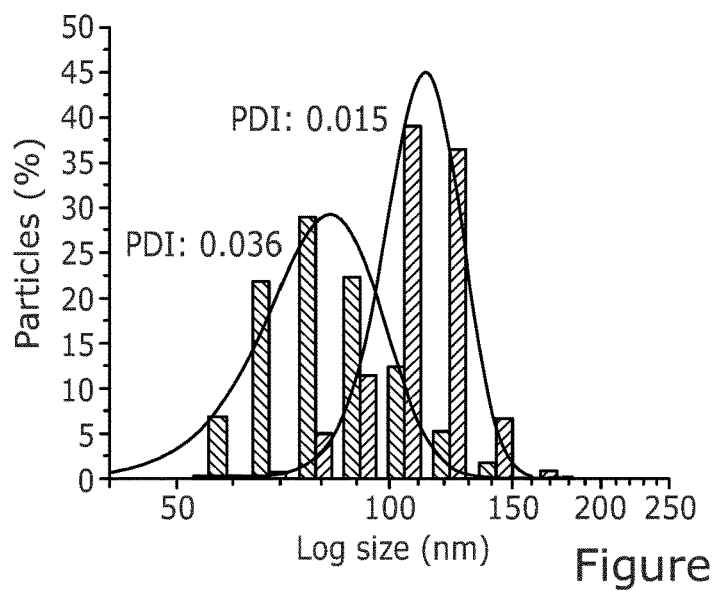
Figure 7F:
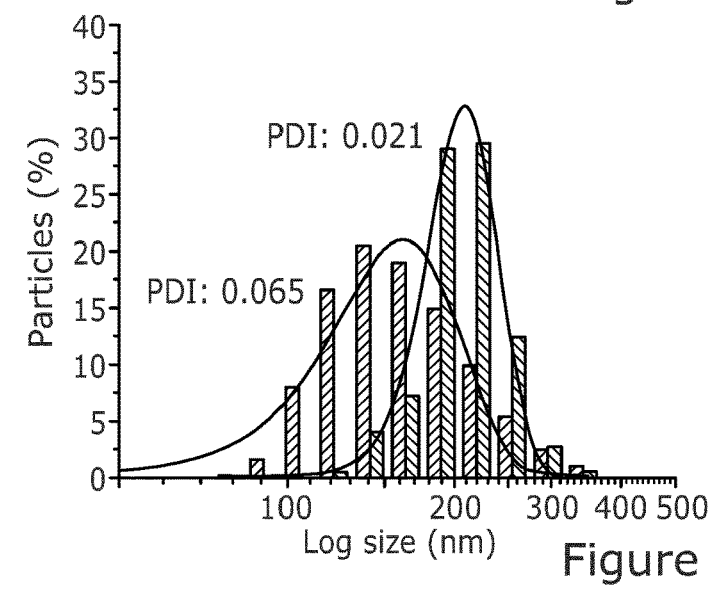

As a model system, we analysed polystyrene particles of 200, 100 and 50 nm with the SPARTA platform upon addition of 50 mM sodium perchlorate to the solution. We found that the perchlorate ratio was distinct between the various sizes and are within bandwidths with minimal overlap (FIG. 7a). The average ratios can be plotted against the log particle volume (calculated from manufacturer's given size) resulting in an excellent linear correlation ($R^2$=0.99) (FIG. 7b). The linear fit of the calibration curve can be used to estimate the particle size of the individual particles trapped with the SPARTA system. These sizes were binned identically to the corresponding DLS number distributions of the particles (FIG. 7c) to yield a histogram of the size distribution (FIG. 7d-f). The main means of comparison between the DLS and SPARTA size measurements is the distribution broadness. This can be characterised by the polydispersity index (PDI), which is the square of the quotient of the standard deviation (o) and the mean (u). For each particle size, the PDI obtained by the SPARTA solution marker-mediated sizing analysis was significantly lower than measured by DLS, demonstrating the ability of SPARTA for accurate single particle sizing analysis.

On-Line Dynamic Reaction Monitoring

The third application of the SPARTA platform, as illustrated schematically in FIG. 2, image 26, is the capability for on-line dynamic reaction monitoring, either on a single particle during the timescale of the reaction, or via continuous sampling of different single particles from the population. This allows the distinction between two different reaction scenarios, where the reaction proceeds uniformly throughout the whole population simultaneously, or where the reaction is initiated on different particles sequentially.

Figure 8A:
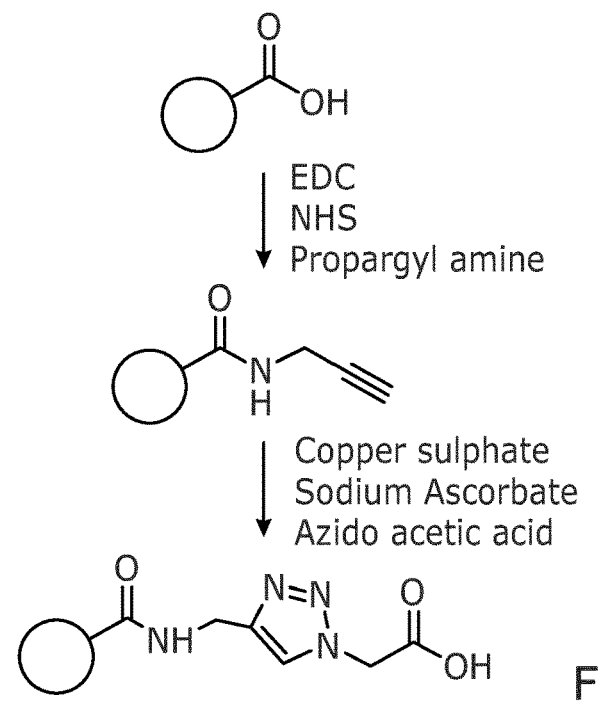
Figure 8B:
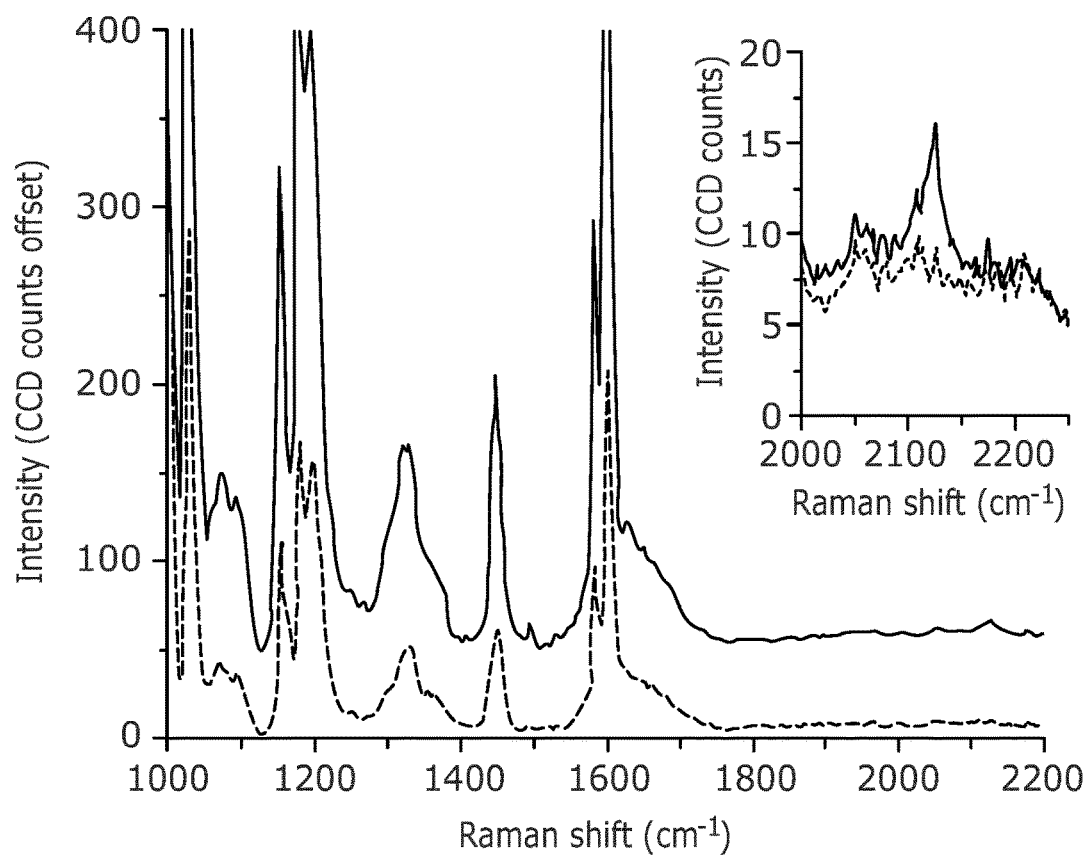
Figure 8C:
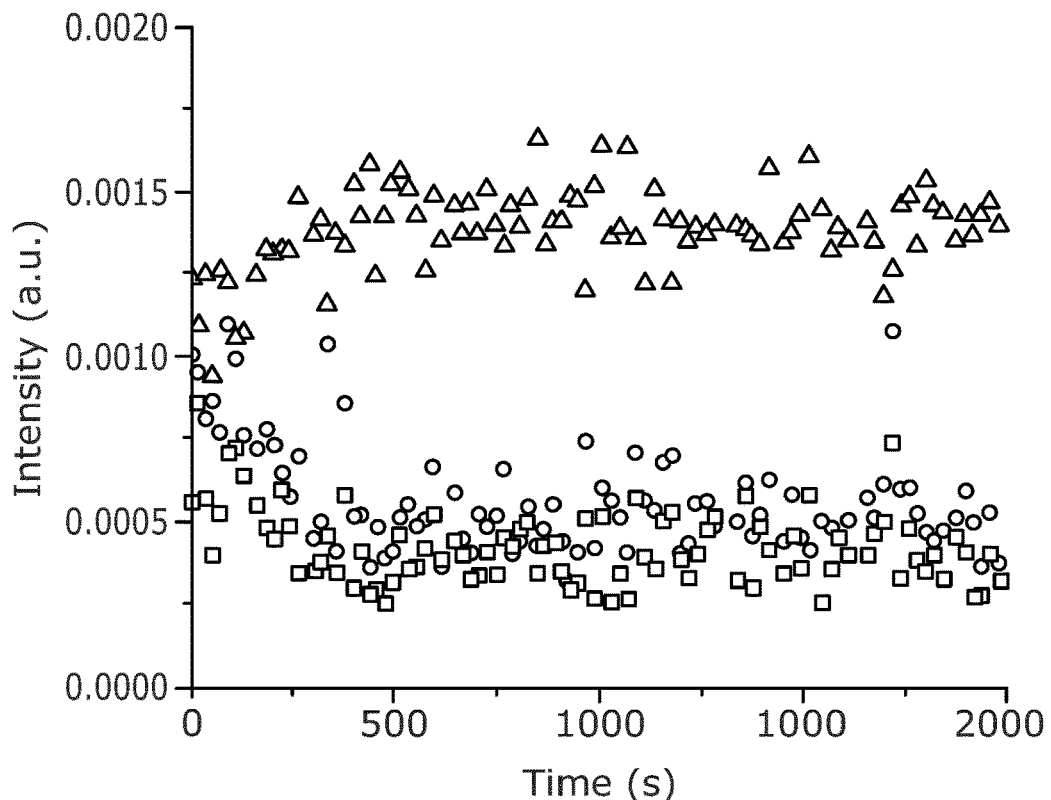
Figure 8D:
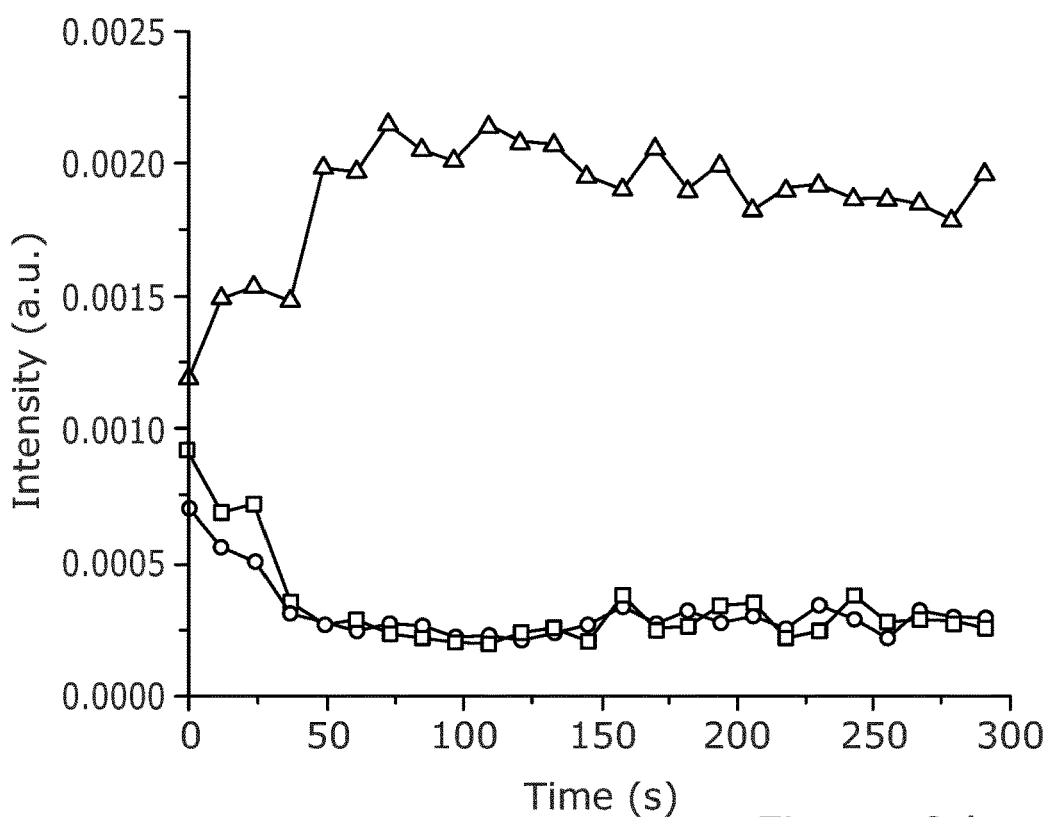

We used a model system to investigate the dynamics of the copper catalysed azide-alkyne cycloaddition (CuAAC) reaction, a type of click reaction which is frequently employed for nanoparticle functionalisations[34,35]. We obtained polystyrene particles with an alkyne functionality via the EDC-NHS mediated coupling of propargyl amine to carboxylated PS particles with an average size of 200 nm. This alkyne was subsequently reacted, in the presence of a copper catalyst, with an azide-containing moiety resulting in the formation of a triazole ring (FIG. 8a). We verified the successful alkyne functionalisation of the polystyrene particles by SPARTA (FIG. 8b), showing a characteristic Raman peak at 2129 cm$^{-1}$. The CuAAC reaction was subsequently conducted while trapping single particles sequentially or holding a single particle continuously in the trap. Both the alkyne and azide signals of the reactants show a clear decrease over time, with the peak intensity of the triazole product increasing in an inverse trend (FIG. 8c). We observed reaction after approximately 8 minutes. Adapting the system to instead hold a single particle in the trap and monitor the spectral changes continuously for the duration of the reaction resulted in a similar trend of reaction, albeit showing reaction completion within 2 minutes, taking into account an additional lead time between activation of the catalyst and acquisition of the first spectrum of approximately 30-60 seconds. In addition, to verify the successful reaction on the alkyne functionalised particles, we monitored the reaction of 3-Azido-7-hydroxycoumarin with the particles by UV-VIS fluorescence, as the triazole product of 3-Azido-7-hydroxycoumarin results in a characteristic fluorescent emission (Abs/Em=404/477 nm). In the presence of the dye and reaction conditions, the fluorescence increased gradually and starts to level off within 30 min (FIG. 16).

SPARTA was also used to analyse cubosome vesicles. Cubosomes are cubic phase lipid nanoparticles composed of cholesterol, monoolein and variable ratios of phosphatidylcholine (PC) and phosphatidic acid (PA). This ratio in PA/PC was clearly visualized on a single particle basis using SPARTA, as shown in FIG. 21. The main difference was the change in the tertiary amine peak at 718 cm$^{-1}$ arising from the PC head group, which decreased with increasing PA/PC ratio.

In addition to the compositional analysis of different cubosome formulations, SPARTA was used to track the dynamics of the enzyme mediated hydrolysis of PC to form PA head groups. Measuring control samples and samples that had been spiked with enzyme that hydrolyzed the sample, kinetics of enzyme activity was measured on nanoparticle substrates. Here, individual particles were trapped, measured and released. The particles were then allowed to diffuse outside of the trapping volume before another particle was subsequently trapped and measured. The results in FIG. 22 show that the different concentrations of enzyme significantly altered the kinetics measured on the individual particles. This tracking on individual particles enables an understanding of heterogeneity within a sample as well as the activity of enzymes (or potentially other active factors) on the composition of cubosome/nanoparticles as a function of time.

Discussion

The SPARTA platform enables concurrent label-free multi-parameter, non-destructive characterisation of particles smaller than the diffraction limit. It combines the efficiency of optical trapping with the established sensitivity of Raman spectroscopy for measuring composition and functionalisation and high-throughput via automation. We have demonstrated efficient trapping and spectral analysis for multiple nanoparticle formulations including different liposome and polymersome compositions, and serial chemical functionalisation of polystyrene particles. Simultaneously, we were able for the first time to evaluate the particle size and distribution based solely on Raman scattering of single particles, through addition of perchlorate as a solution marker. Furthermore, we have demonstrated the temporal analysis capabilities of this platform by monitoring a copper chemistry click reaction as it occurs on the surface of either a population sample or an individual nanoparticle. The automated evaluation of large samples of these particles can provide new insights into the heterogeneity of nanoparticle systems, investigate subpopulations, and monitor dynamic composition changes for myriad sample designs.

The SPARTA platform represents the first automated system to study chemical composition, functionalisation, and size for nanoparticles within a single modality with the label-free chemical and temporal resolution to track on-particle dynamic processes. The SPARTA platform is ideally suited to polymer and lipid systems but can be extended to a wide range of particle formulations with unique vibrational spectra. The technology described here is limited by fundamental properties; it is particularly well suited to samples with low turbidity to generate the particle trapping force gradient, compositions with non-overlapping spectral features, dynamic processes that occur over the course of minutes up to a few hours, and sample concentrations low enough such that no low-level background is contributed to the trapped particle measurement. Each of these considerations can be mitigated by careful selection and preparation of nanoparticle systems for evaluation.

The deployment of the SPARTA platform for complex nanoparticles provides multiplexed information regarding the intricate composition, size, and dynamic processes of these systems and to improve fundamental understanding. Indeed, the SPARTA platform provides, in an automated fashion, feature rich Raman spectra from hundreds of individually trapped particles in a single experiment. In summary, the complementary information obtained from the multifaceted SPARTA platform, regarding particle composition, functionalisation, size and dynamics, has enormous potential to critically impact fields including drug development and delivery, materials science, and cellular biology.

The method and apparatus has been described particularly using an electromagnetic radiation beam comprising a laser beam but other optical sources may be used, in the visible spectrum or beyond such as infra-red or UV spectra. Depending on the optical source used, particle sizes of up to 50 nm, 100 nm, 300 nm, 500 nm or 1 micron may be captured and analysed. For a Raman-based detection modality, an electromagnetic radiation source having a wavelength of 785 nm may optimally be used to analyse particle sizes in the range of 50-300 nm, for example (although these are not hard limits). In general, the particle must be large enough to generate a suitably detectable Raman signal when captured and yet not so large that it will not be trapped by the beam. The lower particle size limit is determined by the relative occupation of the confocal volume dropping quickly with radius, since below this limit, there can be a significant contribution to the signal from surrounding particles. The upper particle size limit is determined by the confocal pinhole. Although the experiments described herein were performed with a confocal volume width of around 500 nm, this may be expanded by taking a larger pinhole thus allowing acquisition of whole particles spectra from bigger particles. Some large particles (e.g. a 1 micron particle) might still be trapped with a beam yet not be completely within the confocal volume of waist portion 21, potentially resulting in the condition where not the whole particle is analysed. Therefore it may be desirable in some circumstances to limit single particle analysis to a size consistent with the beam waist diameter, e.g. 300 nm. Any suitable particle-conveying medium may be used provided that it does not generate a response signal which obscures a Raman response signal from the particle. The particle conveying medium may include active components for reaction with the particles, particularly in the examples of on-line dynamic reaction monitoring.

Other embodiments are intentionally within the scope of the accompanying claims.

REFERENCES

1. Dragovic, R. A. et al. Sizing and phenotyping of cellular vesicles using Nanoparticle Tracking Analysis. *Nanomed. Nanotechnol. Biol. Med.* 7, 780-788 (2011).
2. Filipe, V., Hawe, A. & Jiskoot, W. Critical Evaluation of Nanoparticle Tracking Analysis (NTA) by NanoSight for the Measurement of Nanoparticles and Protein Aggregates. *Pharm. Res.* 27, 796-810 (2010).
3. Domingos, R. F. et al. Characterizing Manufactured Nanoparticles in the Environment: Multimethod Determination of Particle Sizes. *Environ. Sci. Technol.* 43, 7277-7284 (2009).
4. Chiang, C.-K., Chen, W.-T. & Chang, H.-T. Nanoparticle-based mass spectrometry for the analysis of biomolecules. *Chem. Soc. Rev.* 40, 1269-1281 (2011).
5. Kim, J.-H., Bryan, W. W. & Randall Lee, T. Preparation, Characterization, and Optical Properties of Gold, Silver, and Gold-Silver Alloy Nanoshells Having Silica Cores. *Langmuir* 24, 11147-11152 (2008).
6. Zhang, Y. & Zhuo, R.-x. Synthesis and in vitro drug release behavior of amphiphilic triblock copolymer nanoparticles based on poly (ethylene glycol) and polycaprolactone. *Biomaterials* 26, 6736-6742 (2005).
7. Mullen, D. G. & Holl, M. M. B. Heterogeneous ligand-nanoparticle distributions: a major obstacle to scientific understanding and commercial translation. *Acc. Chem. Res.* 44, 1135-1145 (2011).
8. Adjei, I. M., Peetla, C. & Labhasetwar, V. Heterogeneity in nanoparticles influences biodistribution and targeting. *Nanomedicine (London, England)* 9, 267-278 (2014).
9. Kallepitis, C. et al. Quantitative volumetric Raman imaging of three dimensional cell cultures. *Nat Commun* 8, 14843 (2017).
10. Ashkin, A. Acceleration and Trapping of Particles by Radiation Pressure. *Phys. Rev. Lett.* 24, 156-159 (1970).
11. Ashkin, A., Dziedzic, J. M., Bjorkholm, J. E. & Chu, S. Observation of a single-beam gradient force optical trap for dielectric particles. *Opt. Lett.* 11, 288-290 (1986).
12. Cherney, D. P., Bridges, T. E. & Harris, J. M. Optical Trapping of Unilamellar Phospholipid Vesicles: Investigation of the Effect of Optical Forces on the Lipid Membrane Shape by Confocal-Raman Microscopy. *Anal. Chem.* 76, 4920-4928 (2004).
13. Ajito, K. Combined Near-Infrared Raman Microprobe and Laser Trapping System: Application to the Analysis of a Single Organic Microdroplet in Water. *Appl. Spectrosc.* 52, 339-342 (1998).

14. Ajito, K. & Torimitsu, K. Near-infrared Raman spectroscopy of single particles. *TrAC, Trends Anal. Chem.* 20, 255-262 (2001).
15. Maria, G. D. et al. Optical trapping of porous silicon nanoparticles. *Nanotechnology* 22, 505704 (2011).
16. Sanderson, J. M. & Ward, A. D. Analysis of liposomal membrane composition using Raman tweezers. *Chem. Commun.*, 1120-1121 (2004).
17. Meng, F., Zhong, Z. & Feijen, J. Stimuli-Responsive Polymersomes for Programmed Drug Delivery. *Biomacromolecules* 10, 197-209 (2009).
18. Palivan, C. G. et al. Bioinspired polymer vesicles and membranes for biological and medical applications. *Chem. Soc. Rev.* 45, 377-411 (2016).
19. Discher, B. M. et al. Polymersomes: Tough Vesicles Made from Diblock Copolymers. *Science* 284, 1143 (1999).
20. Xue, G. et al. Phase-separation and photoresponse in binary azobenzene-containing polymer vesicles. *Colloids Surf. Physicochem. Eng. Aspects* 436, 1007-1012 (2013).
21. Stremersch, S. et al. Identification of Individual Exosome-Like Vesicles by Surface Enhanced Raman Spectroscopy. *Small* 12, 3292-3301 (2016).
22. Smith, Z. J. et al. Single exosome study reveals subpopulations distributed among cell lines with variability related to membrane content. *Journal of Extracellular Vesicles;* Vol 4 (2015) incl supplements (2015).
23. Schaefer, J. J., Crawford, A. C., Porter, M. D. & Harris, J. M. Confocal Raman Microscopy for Investigating Synthesis and Characterization of Individual Optically Trapped Vinyl-Polymerized Surfactant Particles. *Appl. Spectrosc.* 68, 633-641 (2014).
24. Houlne, M. P., Sjostrom, C. M., Uibel, R. H., Kleimeyer, J. A. & Harris, J. M. Confocal Raman Microscopy for Monitoring Chemical Reactions on Single Optically Trapped, Solid-Phase Support Particles. *Anal. Chem.* 74, 4311-4319 (2002).
25. Hardcastle, C. D. & Harris, J. M. Confocal Raman Microscopy for pH-Gradient Preconcentration and Quantitative Analyte Detection in Optically Trapped Phospholipid Vesicles. *Anal. Chem.* 87, 7979-7986 (2015).
26. Cherney, D. P., Conboy, J. C. & Harris, J. M. Optical-Trapping Raman Microscopy Detection of Single Unilamellar Lipid Vesicles. *Anal. Chem.* 75, 6621-6628 (2003).
27. Cherney, D. P. & Harris, J. M. Confocal Raman Microscopy of Optical-Trapped Particles in Liquids. *Annual Review of Analytical Chemistry* 3, 277-297 (2010).
28. Yamakoshi, H. et al. Alkyne-Tag Raman Imaging for Visualization of Mobile Small Molecules in Live Cells. *J. Am. Chem. Soc.* 134, 20681-20689 (2012).
29. Najer, A. et al. Nanomimics of Host Cell Membranes Block Invasion and Expose Invasive Malaria Parasites. *ACS Nano* 8, 12560-12571 (2014).
30. Cho, E. J. et al. Nanoparticle Characterization: State of the Art, Challenges, and Emerging Technologies. *Mol. Pharm.* 10, 2093-2110 (2013).
31. Wei, H. & Wang, E. Nanomaterials with enzyme-like characteristics (nanozymes): next-generation artificial enzymes. *Chem. Soc. Rev.* 42, 6060-6093 (2013).
32. Todorova, N. et al. Surface Presentation of Functional Peptides in Solution Determines Cell Internalization Efficiency of TAT Conjugated Nanoparticles. *Nano Lett.* 14, 5229-5237 (2014).
33. Almeida, C. S., Herrmann, I. K., Howes, P. D. & Stevens, M. M. Tailoring Cellular Uptake of Conjugated Polymer Nanoparticles Using Modular Amphiphilic Peptide Capping Ligands. *Chem. Mater.* 27, 6879-6889 (2015).
34. Luongo, G. et al. Scalable High-Affinity Stabilization of Magnetic Iron Oxide Nanostructures by a Biocompatible Antifouling Homopolymer. *ACS Applied Materials & Interfaces* 9, 40059-40069 (2017).
35. Algar, W. R. et al. The Controlled Display of Biomolecules on Nanoparticles: A Challenge Suited to Bioorthogonal Chemistry. *Bioconjugate Chem.* 22, 825-858 (2011).

The listing or discussion of an apparently prior-published document in this specification should not necessarily be taken as an acknowledgement that the document is part of the state of the art or is common general knowledge.

Other Methods

SPARTA Raman Micro-Spectroscope

Confocal Raman spectral acquisition was performed on a Raman micro-spectroscope (alpha300R+, WITec, Ulm, Germany). The light source used was a 785 nm laser (Toptica XTRA II) with a 63×/1.0 NA water immersion microscope objective lens (W Plan-Apochromat, Zeiss, Oberkochen, Germany). The scattered light was collected via a 100 μm fibre with a 600 g/mm grating spectrograph (UHTS 300, WITec, Ulm, Germany) and spectra were acquired using a thermoelectrically cooled back-illuminated CCD camera (iDus DU401-DD, Andor, Belfast, UK) with a spectral resolution of 3 $cm^{-1}$ and 85 mW laser power at the sample. Laser control was performed remotely controlled via a serial connection and custom Matlab (2016b) scripts.

SPARTA Standard Sample Preparation

For SPARTA analysis typically 200 μl of particle solution was required, of which approximately half was routinely recovered, depending on the measurement time. Ideal particle concentrations were determined to be between $1 \cdot 10^{10}$-$1 \cdot 10^{12}$ particles per millilitre or around 0.1-0.01% solids for polystyrene particles. Sample solutions were placed on a 22 mm coverslip, affixed to a standard microscopy slide with a drop of phosphate buffered saline (PBS). The sample was placed under the water immersion objective for measurement.

SPARTA Standard Data Analysis

The following preprocessing procedure was applied to all spectra acquired with the SPARTA platform. The spectral centre during acquisition was standard set at 1000 $cm^{-1}$ and the raw data was truncated to the range of 350-1825 $cm^{-1}$ to omit the excitation signal. For the measurements including the alkyne modification, the spectra centre was shifted to 1500 $cm^{-1}$ resulting in a measurement range of 606-2254 $cm^{-1}$. An automated script based on peak amplitude and $2^{nd}$ derivative was employed for cosmic spike removal, followed by a manual visual check. Spectral background was subtracted via curve fitting (Whittaker filter, $\lambda$=100,000) and noise smoothed using a Savitzky-Golay filter (3 points, first order). The resulting spectra were normalised via area under the curve, except for the SPARTA sizing analysis as this is incorporated via the perchlorate ratio calculation. Subsequent statistical analyses (hierarchical cluster analysis, principal component analysis, multivariate curve regression, partial least-squares discriminant analysis) were implemented using PLS Toolbox (Eigenvector Research, Inc.).

DPPC and d-DPPC Liposomes Preparation

Liposomes were prepared according to the following standard procedure. 5 mg/ml stock solutions of lipid (1,2-dipalmitoyl-sn-glycero-3-phosphocholine (DPPC) and 1,2-dipalmitoyl-d62-sn-glycero-3-phosphocholine (DPPC-d62, referred here to as d-DPPC), (Avanti Polar Lipids Inc. AL, USA) and cholesterol (Sigma-Aldrich, UK) were made in chloroform and stored at 20 degrees C. under Argon prior to use. For DPPC liposomes a lipid film was made by adding 500 µl DPPC stock and 43 µl of cholesterol stock solution in a 10 ml round bottom flask resulting in a mol ratio of 85:15 mol % DPPC: cholesterol. For d-DPPC liposomes 250 µl DPPC stock and 250 µl d-DPPC stock was used, resulting in a ratio of 42.5:42.5:15 mol %//DPPC: d-DPPC: cholesterol. The chloroform was evaporated under nitrogen flow to form a thin lipid film. Lipid films were lyophilised overnight in a freeze dryer (Labconco, MO, USA) prior to rehydration. The films were hydrated with 1 ml PBS, shaken for 1 min and sonicated for 1 min. The solutions were then extruded 31 times through a polycarbonate membrane (Avanti Polar Lipids Inc. AL, USA) with a mesh size of 200 nm at 60 degrees C. Liposome size distribution and particle concentration were determined via Nanoparticle Tracking Analysis (NTA).

Polymersome Preparation

PMOXA-b-PDMS-b-PMOXA polymersomes (denoted further as ABA) were prepared from the poly(2-methyloxazoline-b-dimethylsiloxane-b-2-methyloxazoline) ($M_n \cdot 10^3 = 0.5-b-4.8-b-0.5$) triblock copolymer (P18140D-MOXZDMSMOXZ, Polymer Source Inc., Quebec, Canada). 1 ml of a 6 mg/ml stock solution of the triblock copolymer in ethanol was added to a 5 ml round bottom flask. ABA-Heparin polymersomes were made by mixing in 25 wt % PDMS-b-Heparin (Mw=5 kDa–b–11 kDa) block copolymer synthesised as previously described by Najer et al. (Najer, A. et al. Nanomimics of Host Cell Membranes Block Invasion and Expose Invasive Malaria Parasites. *ACS Nano* 8, 12560-12571 (2014)). 1 ml of 6 mg/ml ABA stock was combined with 0.5 ml 4 mg/ml stock of PDMS-b-Heparin block copolymer in ethanol in a 5 ml round bottom flask. The polymer solutions were dried on a rotary evaporator at 50° C. and 20 mbar for approximately 15 min. Subsequently, the polymer films were rehydrated in 1.2 ml PBS for 72 hours under vigorous stirring. The polymer solutions were filtered through a 0.45 µm syringe filter (Millex-HV 13 mm PVDF, Merck KGaA, Germany) and extruded 5 times through a polycarbonate membrane (Avanti Polar Lipids Inc. AL, USA) with a mesh size of 200 nm and subsequently 31 times through a polycarbonate membrane with a mesh size of 100 nm. The polymersomes were further purified by size exclusion chromatography (SEC) (10×300 mm column packed with Sepharose 2B (Sigma-Aldrich, UK)) in PBS, collecting 1 ml fractions. Polymersome size distributions were analysed by DLS and NTA.

Nanoparticle Tracking Analysis (NTA)

Nanoparticle Tracking Analysis (NS300, 532 nm laser, Malvern, UK) was performed by acquisition of 3 times 30 second videos of a 1 ml sample in PBS. The camera level was kept between 13 and 14, with a screen gain of 1 and detection threshold set at 5. The samples were diluted to within the optimum measurement range of $1 \times 10^8$ to $1 \times 10^9$ particles per millilitre for measurement. The measurements were analysed using the Nanosight NTA 3.0 software (Malvern, U K, 2014).

Dynamic Light Scattering (DLS)

Dynamic light scattering (ZEN3600 Zetasizer, Malvern, UK) was performed within disposable semi-micro cuvettes (Brand GMBH, Germany) with 400 µl solution, through acquisition and averaging of 3 measurements (each of 10-15 acquisitions) by NIBS at 173° scattering angle. The measurements were acquired using the Zetasizer Software v.7.02 (Malvern, U K, 2013) The number distributions were used to verify and compare particle size distributions.

Preparation of Cysteine-Tyrosine-Tyrosine (CYY) Tripeptide

CYY tripeptide was synthesized by standard solid phase peptide synthesis using Fmoc protecting group chemistry on Rink-amide MBHA resin and protected Cysteine and Tyrosine amino acids (AGTC Bioproducts Ltd.). Briefly, Fmoc deprotection was performed with 20 v % piperidine in DMF for 10 min, followed by two washes with DMF and DCM. Amino acid couplings were carried out with Fmoc-protected amino acids (4 equivalents), HBTU (3.75 equivalents), and DIEA (6 equivalents) in DMF for 2 hours and the process repeated as per the sequence. The peptide was cleaved from the resin and deprotected with 95% trifluoroacetic acid (TFA), 2.5% tri-isopropylsilane, and 2.5% water for 4 hours. The TFA was removed using rotary evaporation, and the peptide was precipitated and washed with cold diethyl ether 200 mL and 2×50 mL. For purification, the peptide was dissolved in a solution of 4.9% ACN in ultrapure water with 0.1% TFA and purified using reverse-phase preparative high-performance liquid chromatography (HPLC; Shimadzu, Japan) with a C18 Gemini 150×21.2 mm column (Phenomenex, CA, USA) with a 5 µm pore size and a 100 Å particle size. The mobile phase was ultrapure water containing 0.1% TFA @ 15 ml/min and during the 15 minute run the concentration of ACN containing 0.1% TFA in the mobile phase changed was 0% 0-3 min, 0-100% 3-12 min, 100% 12-13 min and 0% 13-15 min. The HPLC fractions were checked for the correct mass using Liquid Chromatography-Mass Spectrometry (LCMS, Agilent, CA, USA) (Observed MW=447.2, Predicted [CYY]H$^+$=447.16), and the pure peptide fractions were combined, rotary evaporated to remove ACN and lyophilised by freeze drying (Labconco, MO, USA).

Serial Functionalisation of Polystyrene Particles

Amine functionalised 0.2 µm polystyrene particles (Polybead Amino 0.20 µm, Polysciences Inc.) were further functionalised with 2-iminothiolane. A reaction buffer of 2 mmol EDTA in PBS was made and adjusted to pH 8 with 2 M NaOH, from which a 6 mg/ml solution of 2-iminothiolane was prepared. For functionalisation 780 µl of reaction buffer was combined with 200 µl of 0.20 µm polystyrene particles (2.6% solids (w/v)) and 20 µl 2-iminothiolane solution and left to react overnight at room temperature. This resulted in a 0.5% solids (w/v) solution of sulfhydryl functionalised particles, which were further diluted 10 times in PBS and purified. Unless otherwise stated, purification was performed by centrifugation for 10 min at 14,000 rcf, after which the pellet was redispersed in PBS. Redispersion was aided by vortexing for 30 seconds and ultrasonication for 1 min, obtaining a clear solution. After each purification step Dynamic light scattering (DLS) measurements were performed to verify the absence of aggregation, prior to SPARTA. A minimum of 100 successful trapping spectra were acquired with the SPARTA experimental parameters set to 1 second iteration acquisition time, 10 seconds high SNR acquisition times and 1 second laser disabling time. The particles were further treated with 10 mg of 5,5-dithiobis-(2-nitrobenzoic acid (DTNB) forming a disulphide bond between the sulfhydryl functionalisation and the TNB anion. The particles were purified and SPARTA was performed to verify disulphide bond formation. The tripeptide functionalisation was obtained by treating the TNB functionalised particles with 2 mg of CYY ($M_w$=446.16 g/mol, 4.5 mM). SPARTA was performed after purification to observe the tripeptide functionalisation. To demonstrate the reversibility of the functionalisation, 100 µl of tris(2-carboxyethyl) phosphine (TCEP, 0.5 M, neutral pH Bond-Breaker™, ThermoFischer Scientific) was added to the TNB functionalised particles, turning the solution bright yellow indicating cleavage of the disulphide bonds. Similarly the disulphide bonds between the particle and the tripeptide were cleaved. After purification the recovery of the sulfhydryl functionalisation was verified by SPARTA.

Dynamic Click Reactions on Polystyrene Particles

Carboxyl functionalised 0.2 µm polystyrene particles (Polybead carboxylate 0.20 µm, Polysciences Inc.) were functionalised with propargyl amine using EDC-NHS coupling. Solutions were made of 20 mg/ml 1-ethyl-3-(3-dimethylaminopropyl) carbodiimide and 20 mg/ml n-hydroxysuccinimide in PBS and 40 µl of each was added to 200 µl of polystyrene particles (2.6% solids) and 800 µl of PBS. The solution was shaken on a thermomixer at room temperature and 20 µl of neat propargylamine was added after 30 min. The reaction was allowed to proceed under continuous shaking overnight. The synthesis solution was diluted 10 times and purified. Purification was performed by centrifugation for 10 min at 14,000 rcf, after which the pellet was redispersed in PBS. Redispersion was aided by vortexing for 30 seconds and ultrasonication for 1 min. After purification, DLS traces were obtained to verify the absence of aggregation, prior to SPARTA. Solutions were made of 100 mM copper sulphate, 100 mM sodium ascorbate and 0.5 M potassium bicarbonate in PBS. Azido acetate was made by addition of a 1 M solution of sodium hydroxide in a molar equivalent to 2-azidoacetic acid (Sigma-Aldrich, UK). The population click reaction was carried out by formation of the triazole by addition of 2.88 µl 100 mM sodium ascorbate, 1.80 µl 100 mM copper sulphate and 0.5 µl neat azido acetic acid to 200 µl of alkyne functionalised polystyrene particles, diluted 100 times in PBS. Droplets of a 0.5 M solution of $KHCO_3$ were applied to adjust the pH to 7. The single particle hold click reaction was performed with addition of 7.46 µl azido acetate (equalling 0.5 µl neat azido acetic acid), with no further pH adjustment necessary.

Click Reaction Monitoring by UV-Vis Analysis

3-Azido-7-hydroxycoumarin (Jena Bioscience GmbH, Germany) was used to validate whether a CuAAC reaction would occur on the alkyne functionalised polystyrene nanoparticles. To do this the fluorescence of the resulting triazole product (Abs/Em=404/477 nm) was monitored by UV-Vis spectroscopy. In a 96 well plate 200 µl of a 1000× dilution of the purified alkyne functionalised polystyrene particles in PBS was combined with 2.88 µl 100 mM sodium ascorbate, 1.80 µl 100 mM copper sulphate and 5 µl 3-Azido-7-hydroxycoumarin 1 µM in water. As controls, the measurements were performed at the same time with exclusion of 3-Azido-7-hydroxycoumarin or copper sulphate. The fluorescence was monitored over 30 minutes and measured at 15 second intervals.

Hybrid Vesicle Analysis by SPARTA

Hybrid vesicles, Janus dendrimersomes, and Sphingomyelin-cholesterol liposomes were prepared via thin film hydration methods in DPBS via sequential vortexing and subsequent size exclusion for purification as needed. Stability assay at room temperature indicates stability over a one month period. Sample concentrations were measured using Nanoparticle Tracking Analysis and stored at 4° C. until measurement. SPARTA protocol utilized 150 µL of sample in PBS at approximately 1013 particles/mL. Trap evaluation time was set to 1.5 seconds after which above-threshold traps were recorded with 10 second integration times to obtain high SNR spectra. Trapping sequences typically were initiated with 200 traps and proceeded automatically until completion. The acquired spectra were processed using custom MATLAB (2016 a/b) scripts for cosmic spike removal, background subtraction, smoothing and normalization. NNLS fitting was performed based on pure spectra acquired from individual components via both native and custom Matlab scripts.

Cubosome Analysis by SPARTA

Compositions including mono olein, cholesterol, and combinations of phophatidylcoline and phosphatidic acid were formed utilizing sonication and homogenation methods. Briefly, formation of cubosomes via sonication involves co-dissolving lipids of the desired composition in solvent, solvent evaporation under nitrogen and removal of excess water using a lyophilizer to create lipid films. This is followed by hydration in the desired buffer, addition of the pre-dissolved stabilizing polymer and tip sonication/homogenization to form a dispersion. Due to volume restrictions, low volume ultrasonication tips are utilized. Prior to SPARTA analysis the cubosomes were kept at room temperature. Phospholipase D (derived from *Streptomyces chromofuscus*) was stored frozen at −80° C. prior to use. For individual experimental runs, the total lipid concentration per 250 µL sample was 0.1 mg/mL mixing with appropriate amounts of Mg/Ca-buffered DPBS and known concentrations of PLD to monitor enzyme activity one cubosome composition and lipid conversion.

SPARTA measurements were performed on 200 µl samples of enzyme spiked cubosome samples with a 10 second high SNR integration time, 1 second iteration time and 1 second laser disabling time. Typically, 200 traps were initialized but this number was altered depending upon the expected activity and concentration of the enzyme added to the sample. Spectra were acquired both in catch and release (population sampling) and trap and hold (single particle timecourse) methods which enabled monitoring of enzyme kinetics. The acquired spectra were processed using custom MATLAB (2016 a/b) scripts for cosmic spike removal, background subtraction, smoothing and normalization.

Extracellular Vesicle Analysis by SPARTA

MDA-MB-231 and MCF10A cell lines were obtained from the ATCC (Manassas, VA, USA). JIMT-1 was obtained through the DSMZ (Braunschweig, Germany). MDA-MB-231 and JIMT-1 cells were cultured in DMEM supplemented with 10% (v/v) FBS, 20 mM HEPES and 1× penicillin/streptomycin (Gibco, Thermo Fischer UK). MCF10A cells were maintained in DMEM/F12 (Gibco) supplemented with 5% (v/v) horse serum (Gibco), 20 ng/ml EGF (Peprotech), 0.5 µg/mL hydrocortisone (Sigma Aldrich), 100 ng/ml cholera toxin (Sigma Aldrich), 10 µg/mL insulin (Sigma Aldrich) and 1× penicillin/streptomycin (Gibco) Cells were cultured at 37° C. and 5% CO2 with media changes every 2 days. Prior to EV isolation cells were cultured in serum-free media to confluence for 2 days after which the conditioned media was collected, centrifuged at 1500×g for 5 min and filtered using a 0.45 µm bottle-top filter. The media was concentrated using spin-filtration (Amicon Ultra-15, 100 kDa) to approximately 500-1000 times and 500 µL was purified via size exclusion chromatography on a 1 cm diameter, 30 cm long column of Sepharose CL2B (Sigma Aldrich UK). 1 mL column fractions were collected and the EV containing fractions were determined using Nanoparticle Tracking Analysis (Nanosight NS300) and correlation of this with a BCA protein quantification assay (Thermo Fisher UK). Prior to SPARTA analysis the EVs were kept frozen at −80° C.

SPARTA measurements were performed on 200 µL sample of purified EVs with a 20 second high signal to noise integration time, 1 second iteration time and 1 second laser disabling time. 200 traps were initialized and a PBS background was collected for 10 measurements each measurement day. The acquired spectra were processed using custom MATLAB (2016 a/b) scripts for cosmic spike removal, background subtraction, smoothing and normalization. PLSDA modeling was performed using the PLS Toolbox (Eigenvector Research).

The invention claimed is:

1. A method of automated particle analysis using an apparatus for particle trapping and data acquisition, comprising:
   (i) performing, using a control system, a calibration procedure for determining a threshold indicative of a particle capture of a target particle from a particle-conveying medium, the calibration procedure comprising establishing, using the control system, a spectral feature which differentiates between (i) a Raman response of the target particle to an electromagnetic radiation beam generated using a single electromagnetic radiation source and (ii) a Raman response of the particle-conveying medium without the target particle to the electromagnetic radiation beam, in which the calibration procedure comprises determining a spectral profile using at least a part of a Raman response spectrum that provides a differentiation, wherein the apparatus comprises the single electromagnetic radiation source, a focusing element, a detector, and the control system configured to control at least the single electromagnetic radiation source and the detector;
   (ii) focusing, using the focusing element, the electromagnetic radiation beam onto the particle-conveying medium, the electromagnetic radiation beam having a waist portion at its focus which defines a particle capture zone for capturing a particle within the electromagnetic radiation beam;
   (iii) automatically performing, by the processor using the detector, a first data acquisition procedure to test for the particle capture of a target particle from the particle-conveying medium, in which the first data acquisition procedure comprises performing a Raman response data gathering procedure sufficient to detect a presence of the spectral profile determined from the calibration procedure above the threshold indicative of the particle capture of a target particle from the particle-conveying medium;
   (iv) if the particle capture of a target particle from the particle-conveying medium is not detected, automatically repeating step (iii);
   (v) if the particle capture of a target particle from the particle-conveying medium is detected, automatically acquiring, using the detector, particle data from the captured particle;
   (vi) automatically reducing, using the electromagnetic radiation source or a modulation device, an intensity of the electromagnetic radiation beam to a sub-capture level to release the particle from the particle capture zone; and
   (vii) automatically repeating steps (ii) to (vi) for successive particles in the particle-conveying medium.

2. The method of claim 1 in which step (v) further comprises:
   automatically performing, by the processor using the detector, a second data acquisition procedure to capture the particle data using at least one analysis modality.

3. The method of claim 2 in which the second data acquisition procedure comprises performing a Raman response data gathering procedure facilitating a greater signal-to-noise ratio than that of the first data acquisition procedure.

4. The method of claim 2 in which the second data acquisition procedure comprises performing a data gathering procedure comprising any one or more of: an extended period of a data capture for higher signal to noise ratio; gathering of spectrally extended data; collection of data using a different modality to the first data acquisition procedure; multiple periods of a data capture for averaging; or data gathering at altered laser power for increased signal to noise ratio.

5. The method of claim 4, in which the second data acquisition procedure comprises performing a data gathering procedure comprising collection of data using a different modality to the first data acquisition procedure, in which the different modality comprises one or more of fluorescence spectra or optical absorption spectra.

6. The method of claim 2 further including using, using the control system, at least one of the first data or the second data acquired in at least one of the first data acquisition procedure or the second data acquisition procedure to determine a size of a captured particle.

7. The method of claim 6 in which determining size of the captured particle comprises determining a decrease in a spectral response signal that is characteristic of the particle-conveying medium without a particle therein, when the particle capture is detected.

8. The method of claim 7 in which the spectral signal characteristic of the particle-conveying medium comprises a spectral signal from a marker dispersed within the particle-conveying medium.

9. The method of claim 8 in which the marker comprises perchlorate ions.

10. The method of claim 1 in which the acquired particle data in step (v) comprises data from the first data acquisition procedure.

11. The method of claim 1 in which step (vi) further comprises waiting for a delay period after reducing the intensity of the electromagnetic radiation beam to the sub-capture level, sufficient for a previously captured particle to be transported out of the particle capture zone and into a surrounding medium.

12. The method of claim 1 in which the calibration procedure comprises using one or more of a peak amplitude, multiple peak amplitudes, or an area under one or more portions of the Raman response spectrum.

13. The method of claim 1, wherein the calibration procedure comprises:
   acquiring, using the detector, a reference spectrum from the particle-conveying medium without a target particle therein;
   acquiring, using the detector, a test spectrum from the particle-conveying medium with a target particle therein;
   determining, using the control system, a difference between the reference spectrum and the test spectrum; and
   if the difference is greater than a noise threshold of the reference spectrum, determining, using the control system, that a target particle has been captured.

14. The method of claim 13 further including establishing, using the control system, a spectral feature in the test spectrum which is greater than the noise threshold and which therefore differentiates between (i) a Raman response of a target particle to the beam and (ii) a Raman response of the particle-conveying medium without a target particle to the beam.

15. The method of claim 14, wherein the spectral feature is a spectral feature that differs most strongly from the reference spectrum.

16. The method of claim 13, in which the calibration procedure comprises:
acquiring, using the detector, a further test spectrum from the particle-conveying medium with a second particle in the particle capture zone;
determining, using the control system, a difference between the reference spectrum and the further test spectrum that corresponds to a second spectral feature characterising the presence of the second particle in the particle capture zone; and
if the difference corresponding to the second spectral feature is greater than the noise threshold of the reference spectrum, determining, using the control system, that the second particle has been captured.

17. The method of claim 1 further including:
after step (v), initiating a chemical change in a captured particle and repeating step (v), or
after step (vi) initiating a chemical change in the particles in the particle-conveying medium and repeating steps (ii) to (vi).

18. The method of claim 1 further including:
monitoring, using the control system, a chemical change in the captured particle by repeating step (v), or
monitoring, using the control system, a chemical change in the particles in the particle-conveying medium by repeating steps (ii) to (vi).

19. The method of claim 1 in which step (vi) comprises disabling or shuttering the beam.

20. The method of claim 1, in which the focusing element is an aqueous immersible focusing element, and in which the particle-conveying medium is an aqueous or aqueous-based medium.

21. The method of claim 1, in which the spectral profile that provides the differentiation is specific to a formulation comprising the target particle.

22. A particle trapping and data acquisition apparatus comprising:
a single electromagnetic radiation source;
a focusing element;
a detector; and
a control system configured to:
perform a calibration procedure for determining a threshold indicative of a particle capture of a target particle from a particle-conveying medium, the calibration procedure comprising establishing, using the control system, a spectral feature which differentiates between (i) a Raman response of a target particle to an electromagnetic radiation beam generated using the electromagnetic radiation source and (ii) a Raman response of the particle-conveying medium without a target particle to the electromagnetic radiation beam, in which the calibration procedure comprises determining a spectral profile using at least a part of a Raman response spectrum that provides a differentiation;
control the single electromagnetic radiation source to generate the electromagnetic radiation beam which is focused using the focusing element onto the particle-conveying medium, the electromagnetic radiation beam having a waist portion at its focus which defines a particle capture zone for capturing a particle within the electromagnetic radiation beam; and
control the detector to:
automatically perform a first data acquisition procedure to test for the particle capture of a target particle from the particle-conveying medium, in which the first data acquisition procedure comprises performing a Raman response data gathering procedure sufficient to detect a presence of the spectral profile determined from the calibration procedure above the threshold indicative of the particle capture of a target particle from the particle-conveying medium;
if the particle capture of a target particle from the particle-conveying medium is not detected, automatically repeat the first data acquisition procedure;
if the particle capture of a target particle from the particle-conveying medium is detected, automatically acquire particle data from the captured particle;
automatically control the single electromagnetic radiation source or a modulation device to reduce an intensity of the electromagnetic radiation beam to a sub-capture level to release the particle from the particle capture zone; and
except for performing the calibration procedure, automatically repeat for successive particles in the particle-conveying medium.

23. A non-transitory computer readable medium having instructions stored therein, which when executed by a processor of a particle trapping and data acquisition apparatus, cause the particle trapping and data acquisition apparatus to:
(i) perform a calibration procedure for determining a threshold indicative of a particle capture of a target particle from a particle-conveying medium, the calibration procedure comprising establishing, using a control system, a spectral feature which differentiates between (i) a Raman response of a target particle to an electromagnetic radiation beam generated using a single electromagnetic radiation source and (ii) a Raman response of the particle-conveying medium without a target particle to the electromagnetic radiation beam, in which the calibration procedure comprises determining a spectral profile using at least a part of a Raman response spectrum that provides a differentiation, wherein the apparatus comprises the single electromagnetic radiation source, a focusing element, a detector, and the control system configured to control at least the single electromagnetic radiation source and the detector;
(ii) focus the electromagnetic radiation beam onto the particle-conveying medium, the electromagnetic radiation beam having a waist portion at its focus which defines a particle capture zone for capturing a particle within the electromagnetic radiation beam;
(iii) automatically perform a first data acquisition procedure to test for the particle capture of a target particle from a particle-conveying medium, in which the first data acquisition procedure comprises performing a Raman response data gathering procedure sufficient to detect a presence of the spectral profile determined from the calibration procedure above the threshold indicative of the particle capture;
(iv) if the particle capture of a target particle from a particle-conveying medium is not detected, automatically repeat step (iii);

(v) if the particle capture of a target particle from a particle-conveying medium is detected, automatically acquire, using the detector, particle data from the captured particle;

(vi) automatically reduce, using the electromagnetic radiation source or a modulation device, an intensity of the electromagnetic radiation beam to a sub-capture level to release the particle from the particle capture zone; and (vii) automatically repeat steps (ii) to (vi) for successive particles in the particle-conveying medium.

24. The method of claim 1, in which step (ii) comprises defining the particle capture zone using a single-beam optical trapping effect, or a single-beam gradient force trapping effect.

25. A method of trapping and performing data acquisition of a particle, comprising:

performing, using a processor of a control system, a calibration procedure for determining a threshold indicative of a particle capture of a target particle from a particle-conveying medium, the calibration procedure comprising determining a spectral profile using at least a part of a Raman response spectrum that provides a differentiation between a Raman response of a target particle to an electromagnetic radiation beam generated using a single electromagnetic radiation source and a Raman response of the particle-conveying medium without a target particle;

focusing the electromagnetic radiation beam onto the particle-conveying medium to define a particle capture zone for capturing particles within the electromagnetic radiation beam;

automatically performing, by the processor, a first data acquisition procedure to test for the particle capture of a target particle from the particle-conveying medium, the first data acquisition procedure comprising performing a Raman response data gathering procedure sufficient to detect a presence of the spectral profile;

automatically, by the processor, repeating the first data acquisition procedure in response to the particle capture of a target particle from the particle-conveying medium is not detected;

automatically, by the processor, acquiring particle data from the captured particle in response to the particle capture of a target particle from a particle-conveying medium being detected; and automatically, by the processor, reducing an intensity of the electromagnetic radiation beam to a sub-capture level to release the particle from the particle capture zone.

26. The method of claim 25, wherein the electromagnetic radiation beam has a waist portion at its focus which defines the particle capture zone.

27. The method of claim 25, wherein the presence of the spectral profile is determined from a calibration procedure above a threshold indicative of the particle capture.

28. The method of claim 1, wherein focusing the electromagnetic radiation beam onto the particle-conveying medium includes the particle-conveying medium being a liquid particle-conveying medium.

* * * * *